(12) United States Patent
Zhao et al.

(10) Patent No.: US 12,169,019 B1
(45) Date of Patent: Dec. 17, 2024

(54) SYSTEMS AND METHODS FOR A TRANSMISSION

(71) Applicant: Dana Limited, Maumee, OH (US)

(72) Inventors: Weiguo Zhao, Wuxi (CN); Filip Van Raepenbusch, Bruges (BE); Filip D. Schacht, Meulebeke (BE); Quan Liu, Wuxi (CN)

(73) Assignee: DANA LIMITED, Maumee, OH (US)

( * ) Notice: Subject to any disclaimer, the term of this patent is extended or adjusted under 35 U.S.C. 154(b) by 0 days.

(21) Appl. No.: 18/450,310

(22) Filed: Aug. 15, 2023

(51) Int. Cl.
| | | |
|---|---|---|
| *B60K 1/02* | (2006.01) | |
| *B60K 17/28* | (2006.01) | |
| *B60K 25/00* | (2006.01) | |
| *F16H 3/56* | (2006.01) | |
| *F16H 37/06* | (2006.01) | |
| *F16H 59/02* | (2006.01) | |
| *F16H 59/36* | (2006.01) | |
| *F16H 61/12* | (2010.01) | |
| *F16H 61/68* | (2006.01) | |

(Continued)

(52) U.S. Cl.
CPC ............... *F16H 59/02* (2013.01); *B60K 1/02* (2013.01); *B60K 17/28* (2013.01); *B60K 25/00* (2013.01); *F16H 37/065* (2013.01); *F16H 59/36* (2013.01); *F16H 61/12* (2013.01); *F16H 61/68* (2013.01); *B60K 2025/005* (2013.01); *F16H 2059/0221* (2013.01); *F16H 2059/145* (2013.01); *F16H 2059/148* (2013.01); *F16H 2061/0087* (2013.01); *F16H 2061/1296* (2013.01); *F16H 2200/0021* (2013.01); *F16H 2200/0034* (2013.01); *F16H 2200/2005* (2013.01); *F16H 2200/2041* (2013.01)

(58) Field of Classification Search
CPC ..... F16H 2200/0004; F16H 2200/2005; F16H 2200/2041–2061; F16H 2200/2069–2074; F16H 2200/2084–2092; B60K 17/08–28
See application file for complete search history.

(56) References Cited

U.S. PATENT DOCUMENTS

| | | |
|---|---|---|
| 7,128,680 B2 | 10/2006 | Holmes |
| 9,604,529 B2 | 3/2017 | Choi |
| 9,809,098 B2 | 11/2017 | Tsao et al. |

(Continued)

FOREIGN PATENT DOCUMENTS

JP 2013095386 A 5/2013

*Primary Examiner* — Ernesto A Suarez
*Assistant Examiner* — Lillian T Nguyen
(74) *Attorney, Agent, or Firm* — McCoy Russell LLP

(57) ABSTRACT

Methods and systems are provided for an assembly comprising a first motor positioned on a first shaft, a second motor positioned on a second shaft, a first wet clutch selectively coupled to the first shaft, a second wet clutch selectively coupled to a drive axle, a third wet clutch selectively coupled to the first shaft, and a brake clutch fixed to a housing of the assembly. The assembly comprises a planetary gearset positioned on the second shaft having gears selectively coupled to the third wet clutch, the first wet clutch or to the brake clutch. The assembly comprises a first one-way clutch and a second one-way clutch opposing the first one-way clutch, the first one-way clutch and the second one-way clutch selectively coupled to the first shaft, where the first one-way clutch and the second one-way clutch are directly connected to two gear trains to drive a PTO shaft.

20 Claims, 16 Drawing Sheets

(51) Int. Cl.
*F16H 59/14* (2006.01)
*F16H 61/00* (2006.01)

(56) References Cited

U.S. PATENT DOCUMENTS

| | | |
|---|---|---|
| 10,479,187 B2 * | 11/2019 | Lubben ................. B60W 20/30 |
| 10,807,466 B1 | 10/2020 | Haka et al. |
| 10,982,736 B2 * | 4/2021 | Steinberger .............. B60K 6/52 |
| 2008/0300100 A1 * | 12/2008 | Matsubara ................ B60L 7/14 |
| | | 477/5 |
| 2020/0247239 A1 * | 8/2020 | Stoltz ................... B60W 10/30 |
| 2022/0170534 A1 | 6/2022 | Hannon et al. |
| 2024/0239179 A1 * | 7/2024 | Van Raepenbusch ....................... |
| | | B60K 17/28 |

* cited by examiner

|  | Mode | Gear | Clutch 1 | Clutch 2 | Clutch 3 | Clutch 4 (brake) |
|---|---|---|---|---|---|---|
| single motor drive | 1 | 1 |  |  |  | ■ |
|  | 2 | 2 |  | ■ |  |  |
| dual motor drive | 3 | 1 | ■ |  |  |  |
|  | 4 | 2 |  | ■ | ■ |  |
| single motor drive | tow | - |  |  | ■ |  |

FIG. 2

SYSTEMS AND METHODS FOR A TRANSMISSION

TECHNICAL FIELD

The present description relates generally to systems and methods for a dual motor, two speed transmission.

BACKGROUND AND SUMMARY

Off-highway heavy duty vehicles may demand increased (or reduced) drive speed, tractive power, or power take-off (PTO) functionality depending on the application. Traditional off-highway heavy duty vehicles having internal combustion powertrains often combine PTO functionality and propulsion, wherein power may be directed to the PTO, split between the driveshaft and the PTO, or to the driveshaft only by operating one or more clutches. In contrast, electric off-highway heavy duty vehicles commonly use separate motors for PTO functionality and propulsion.

The inventors herein have recognized potential issues with such systems. Electrified transmissions with PTO functionality rely on power management to ensure that there is sufficient power to drive the PTO while also meeting the power demands of the rest of the vehicle. This can be particularly challenging in heavy duty applications where the PTO is using significant amounts of power. Similarly, power demand to drive the PTO and the rest of the vehicle may vary depending on the specific application, e.g., loader, bulldozer, etc. For example, some applications may demand high power for shorter periods of time. As another example, some applications may demand relatively high load variability and load duration depending on the work performed. In other examples, PTO operation may be demanded while the vehicle is at rest, reversing, traversing a slope, and so on. Configurations having a PTO motor separate from the drive motor may lack flexibility to satisfy a variety of off-highway and heavy duty applications.

In one example, the issues described above may be addressed by an assembly comprising: a first motor position on a first shaft; a second motor positioned on a second shaft, a first wet clutch selectively coupled to the first shaft, a second wet clutch selectively coupled to a drive axle, a third wet clutch selectively coupled to the first shaft, a brake clutch fixed to a housing of the assembly; a planetary gear set comprising a sun gear positioned on the second shaft, a planet carrier selectively coupled to the third wet clutch, and a ring gear selectively coupled to the first wet clutch or to the brake clutch; and a first one-way clutch and a second one-way clutch opposing the first one-way clutch, the first one-way clutch and the second one-way clutch selectively coupled to the first shaft, where the first one-way clutch is directly connected to a first gear train to drive a PTO shaft and the second one-way clutch is directly connected to a second gear train to drive the PTO shaft. In this way, an e-transmission layout comprising three wet clutches and a brake clutch for shifting between two motors and/or two speeds, and two one-way clutches for driving a PTO via the first motor may fit several applications.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 2 shows a table of operating modes for the dual motor transmission.

DETAILED DESCRIPTION

The following description relates to systems and methods for an electric transmission. The electric transmission comprises two electric motors, provides two speeds with a planetary gear set, and includes a plurality of wet clutches for shifting between a plurality of operating modes and the two speeds. A first motor is designated for tractive driving and a second motor is designated for one or both of tractive driving and operating a power take-off unit (PTO). The two motors may be used together to create a high tractive effort at low speeds (e.g., less than 5 kilometers/hour [km/hr]) or to be able to achieve higher speeds (e.g., in the range of 25-50 km/hr) at relatively lower tractive effort. For some applications, motor power may be downsized for pure electrification. For other applications, continuous motor power may be generated with similar size motors, for example, by generating peak power for shorter periods via the first motor and by generating high power for extended periods via the first motor and the second motor. As a result, the system may reduce conflict between motor peak power time and off-highway uncontrollable duty.

Figure 1:
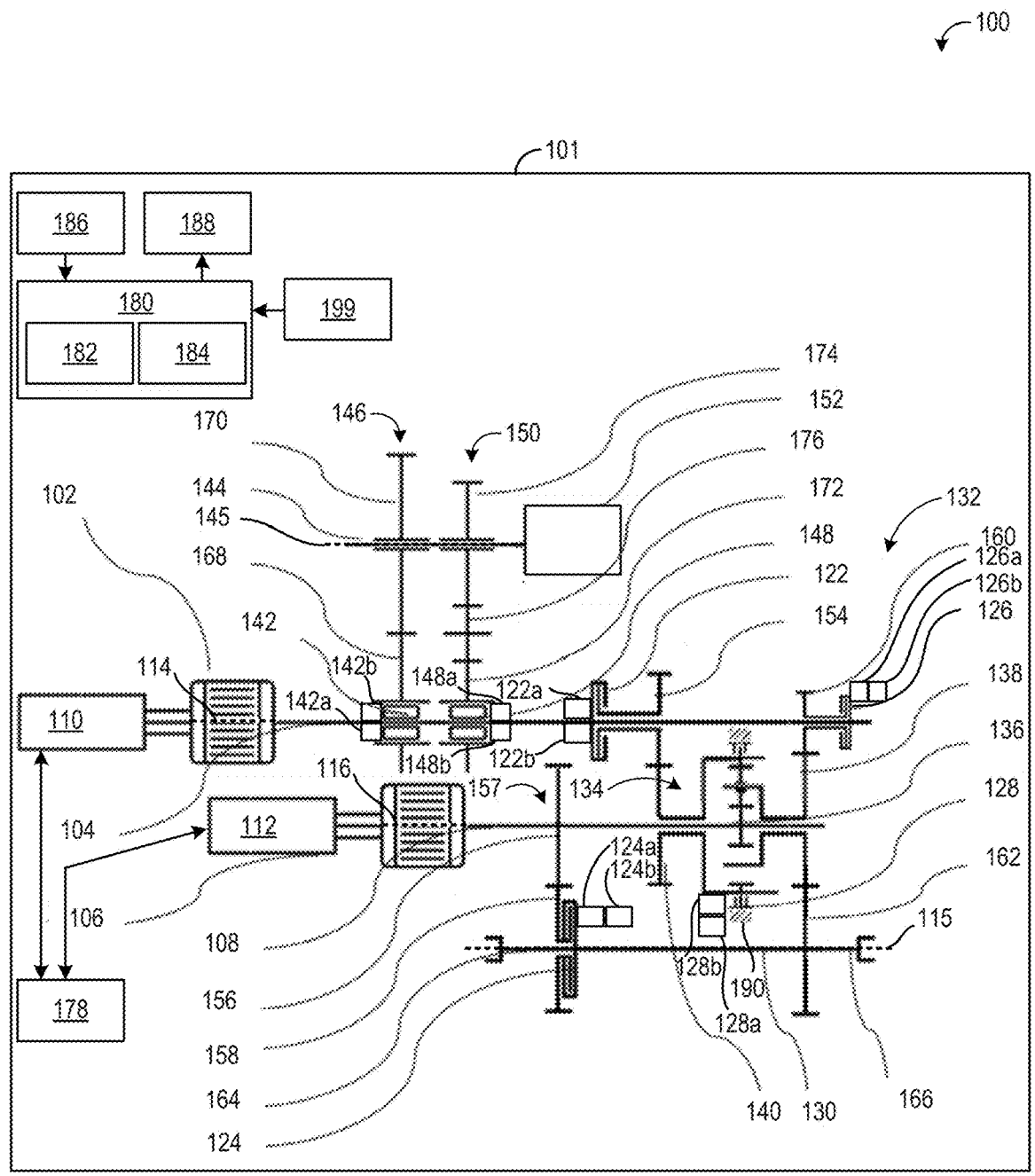
FIG. 1 shows a dual motor transmission with a power take off (PTO).
Figure 3:
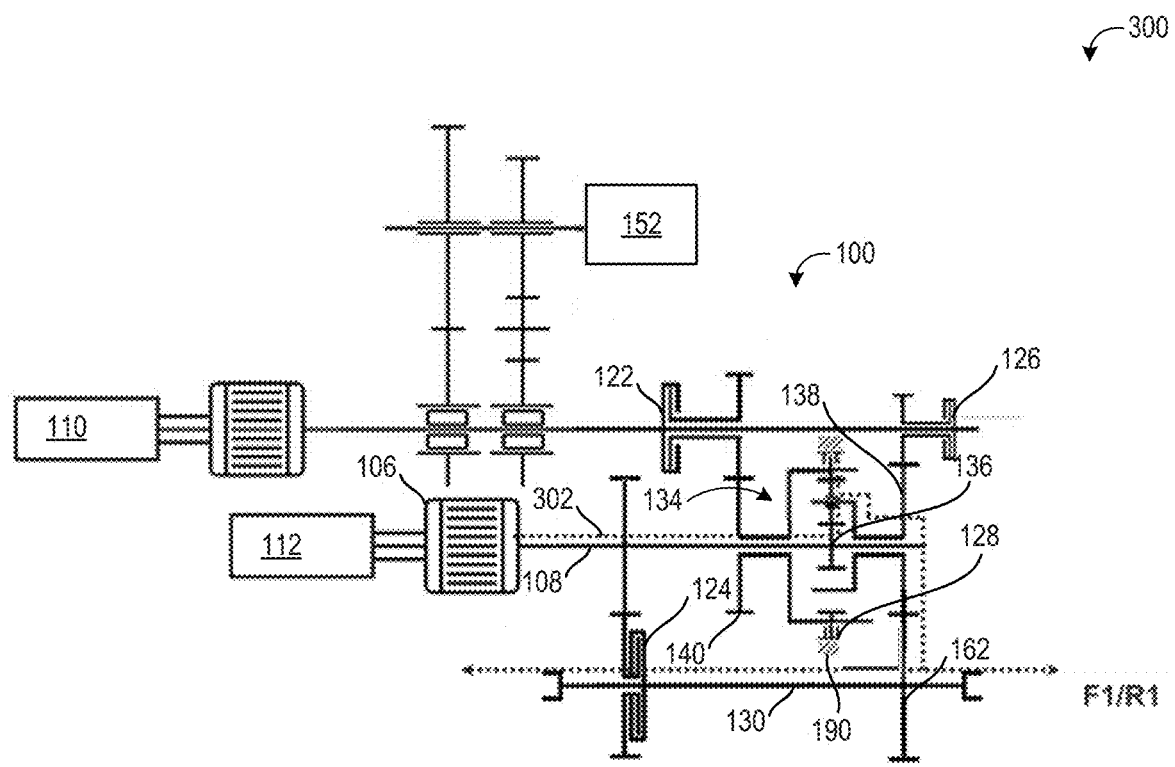
FIG. 3 shows a first power path of the dual motor transmission in a first operating mode.
Figure 4:
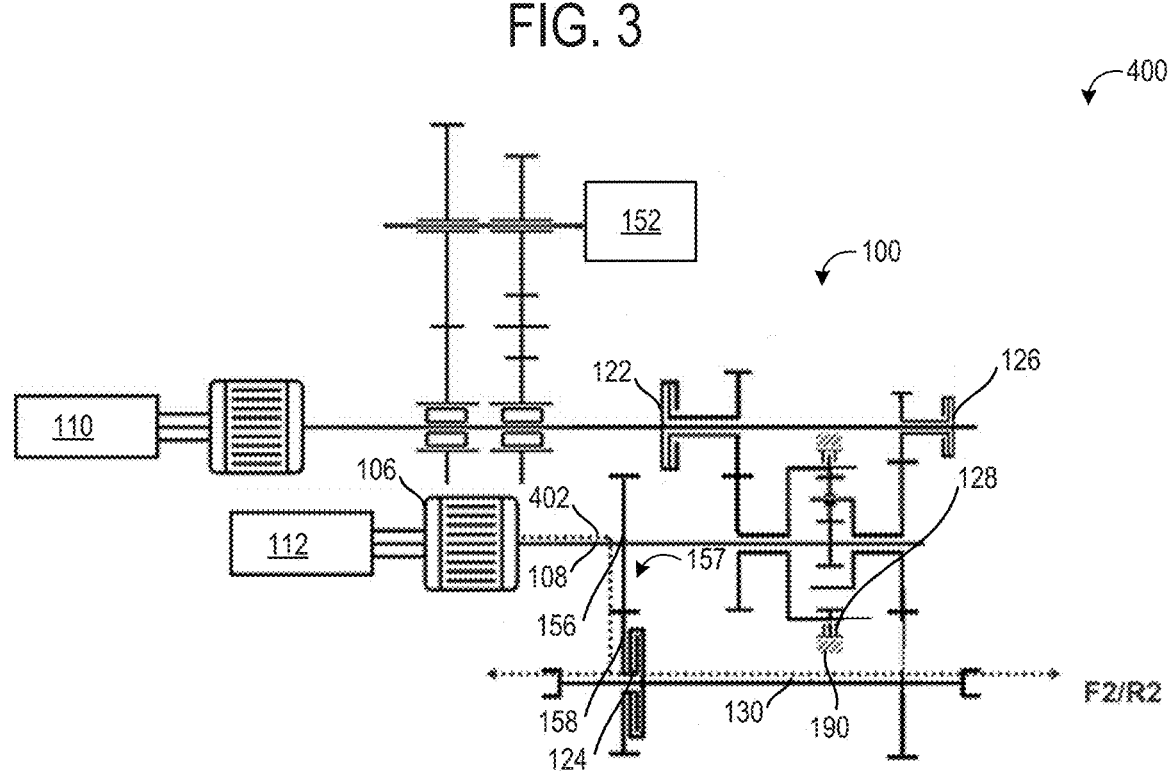
FIG. 4 shows a second power path of the dual motor transmission in a second operating mode.
Figure 5:
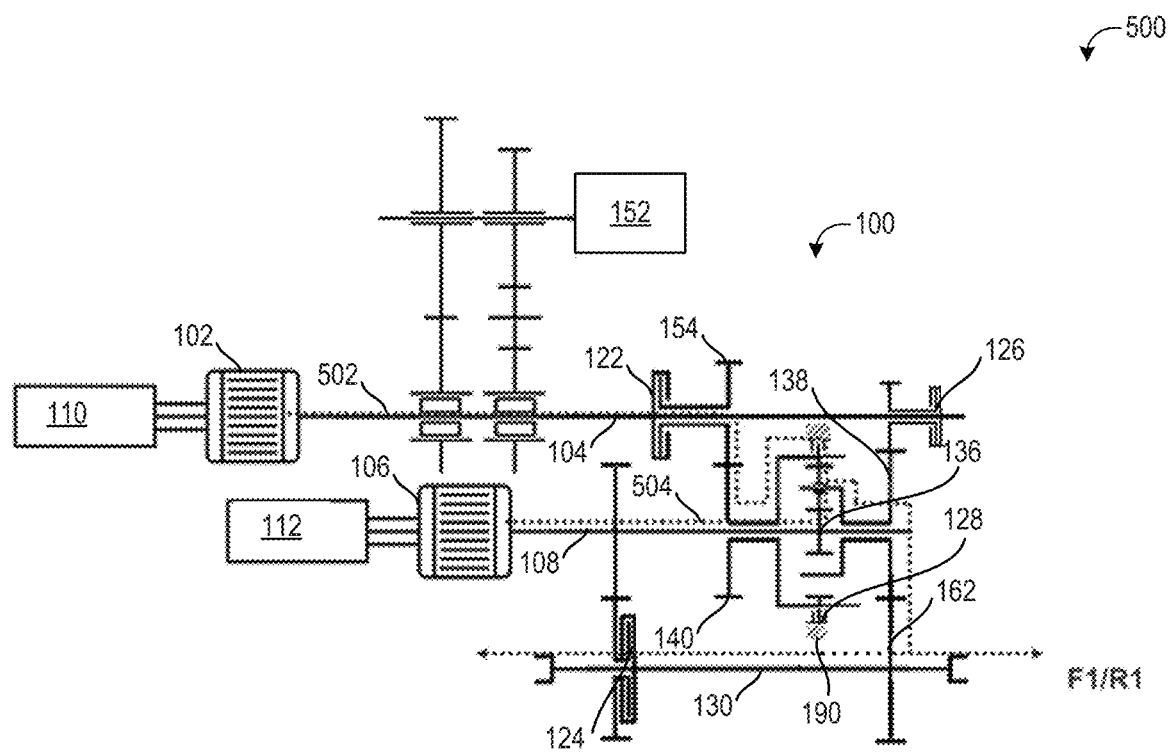
FIG. 5 shows a third power path of the dual motor transmission in a third operating mode.
Figure 6:
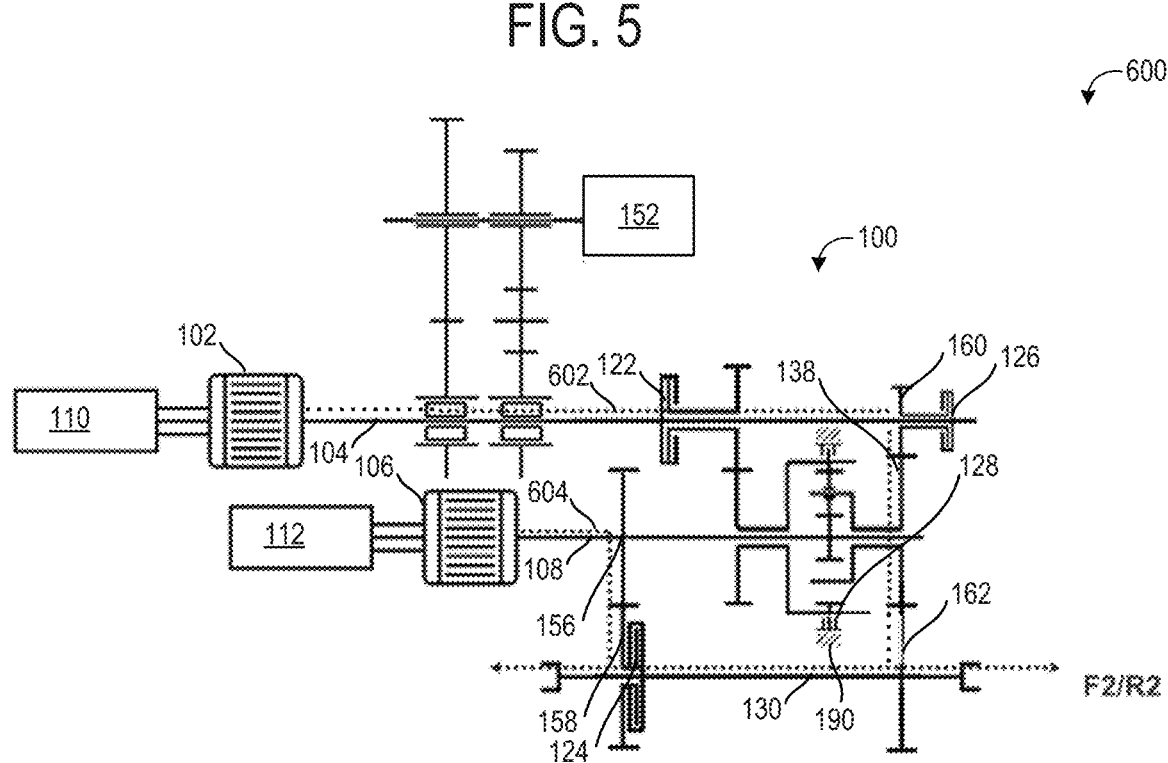
FIG. 6 shows a fourth power path of the dual motor transmission in a fourth operating mode.
Figure 7:
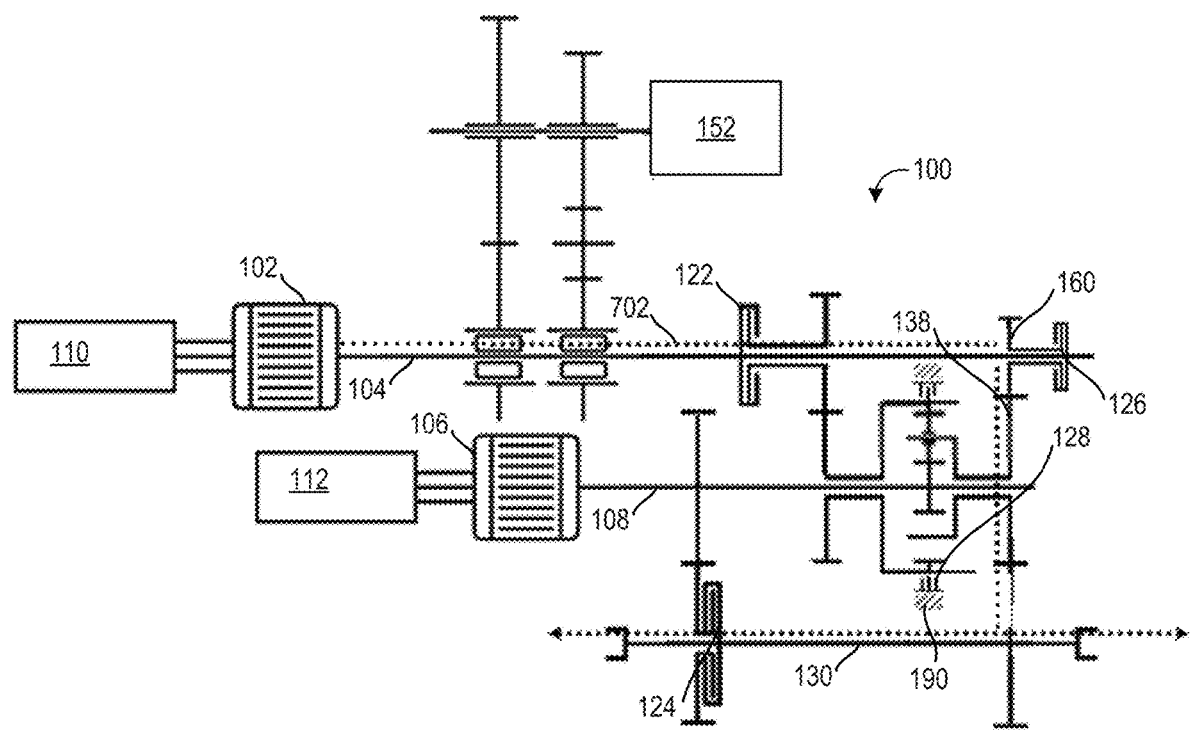
FIG. 7 shows a fifth power path of the dual motor transmission in a tow mode.
Figure 8:
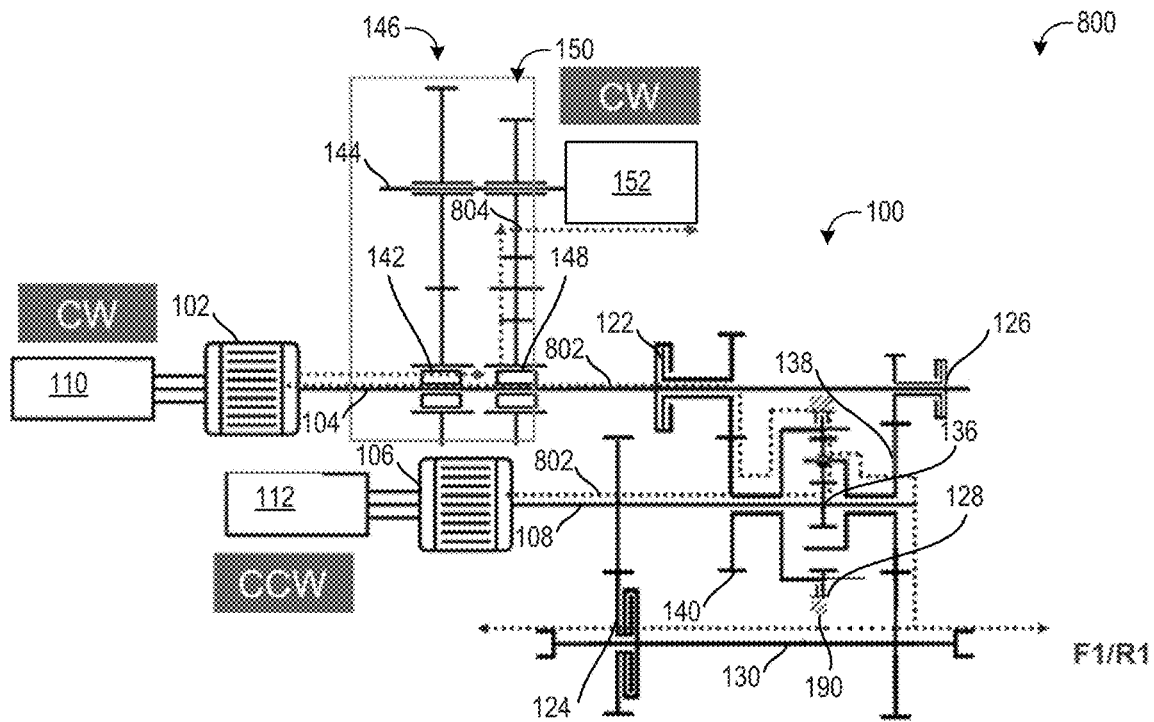
FIG. 8 shows a first example of power paths to the PTO and drive wheels in a first gear.
Figure 9:
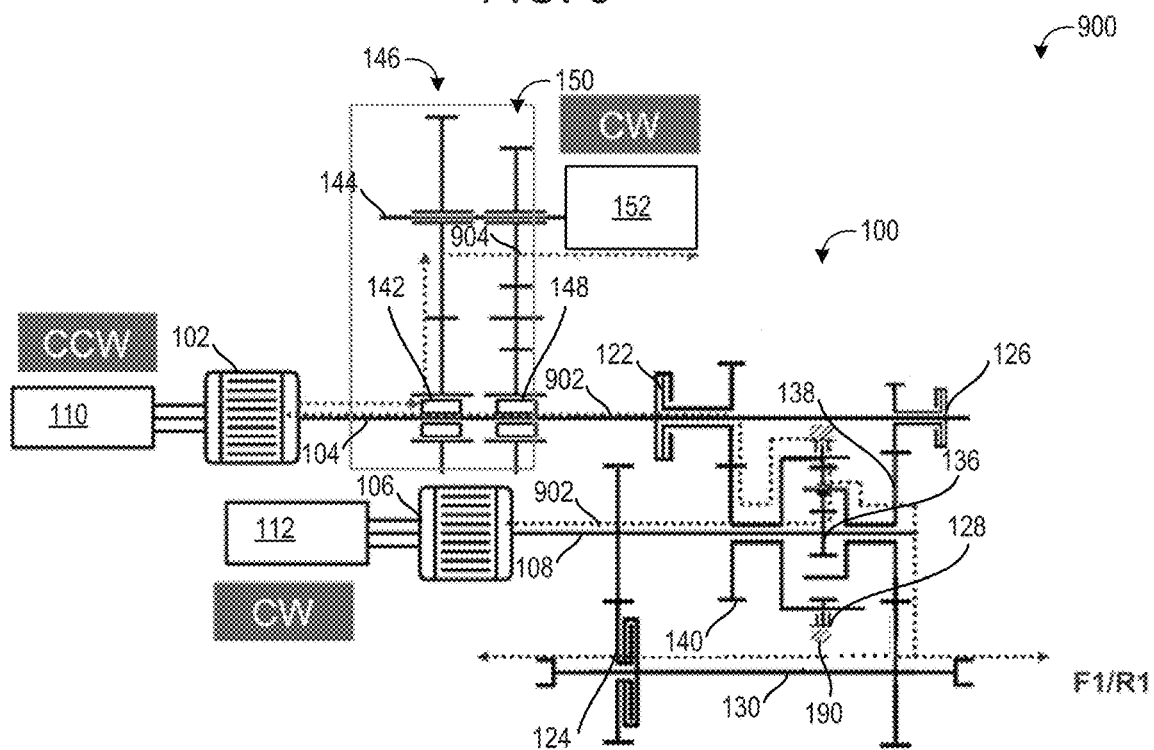
FIG. 9 shows a second example of the power paths to the PTO and drive wheels in the first gear.

An example of a dual motor transmission with a power take off unit is shown in FIG. 1. The dual motor transmission may be controlled in five modes and two gears. A table of the five modes, two gears, and clutches for selecting from the modes and gears is shown in FIG. 2. Based on the mode and gear selection, a power path travels from one or both of the first motor to a first shaft and the second motor to a second shaft, through a planetary gearset, and to a drive axle. In one example, a first operating mode may comprise controlling the second motor to generate power for tractive driving in a first gear. The power path through the dual motor transmission in the first operating mode is shown in FIG. 3. In one example, a second operating mode may comprise controlling the second motor to generate power for tractive driving in a second gear. The power path through the dual motor transmission in the second operating mode is shown in FIG. 4. A third operating mode may comprise controlling the first and second motors to generate power for driving in the first gear. The power path through the dual motor transmission in the third operating mode is shown in FIG. 5. A fourth operating mode may comprise controlling the first and second motors to generate power for driving in the second gear. The power path through the dual motor transmission in the fourth mode is shown in FIG. 6. The power path through the dual motor transmission in a fifth mode, or tow mode, is shown in FIG. 7. A first example and a second example of the power paths to the PTO and drive axle in the third operating mode are shown in FIGS. 8-9, respectively.

Figure 10:
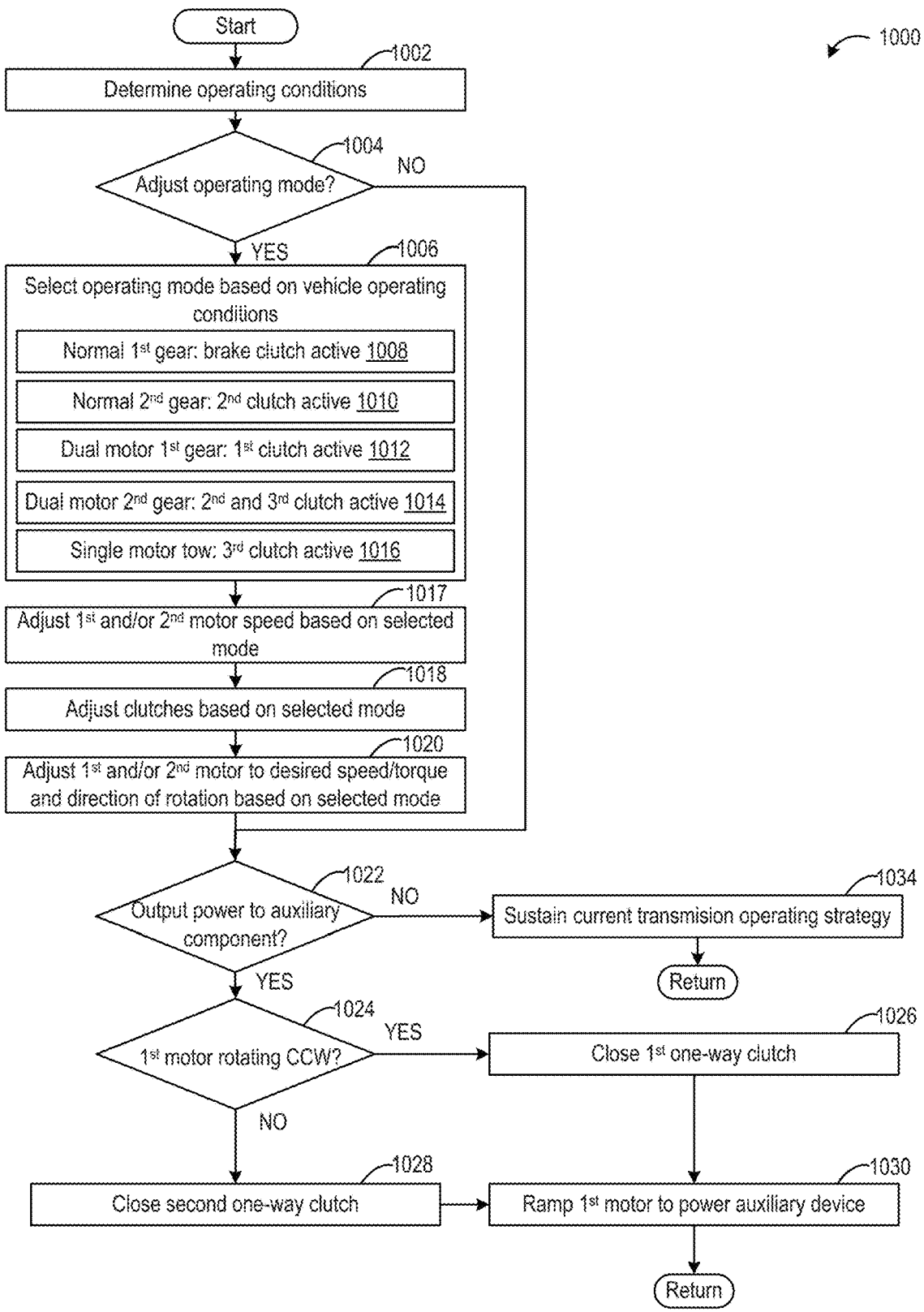
FIG. 10 shows a flow chart illustrating a first example method for operating mode and gear selection in a dual motor transmission.
Figure 11:
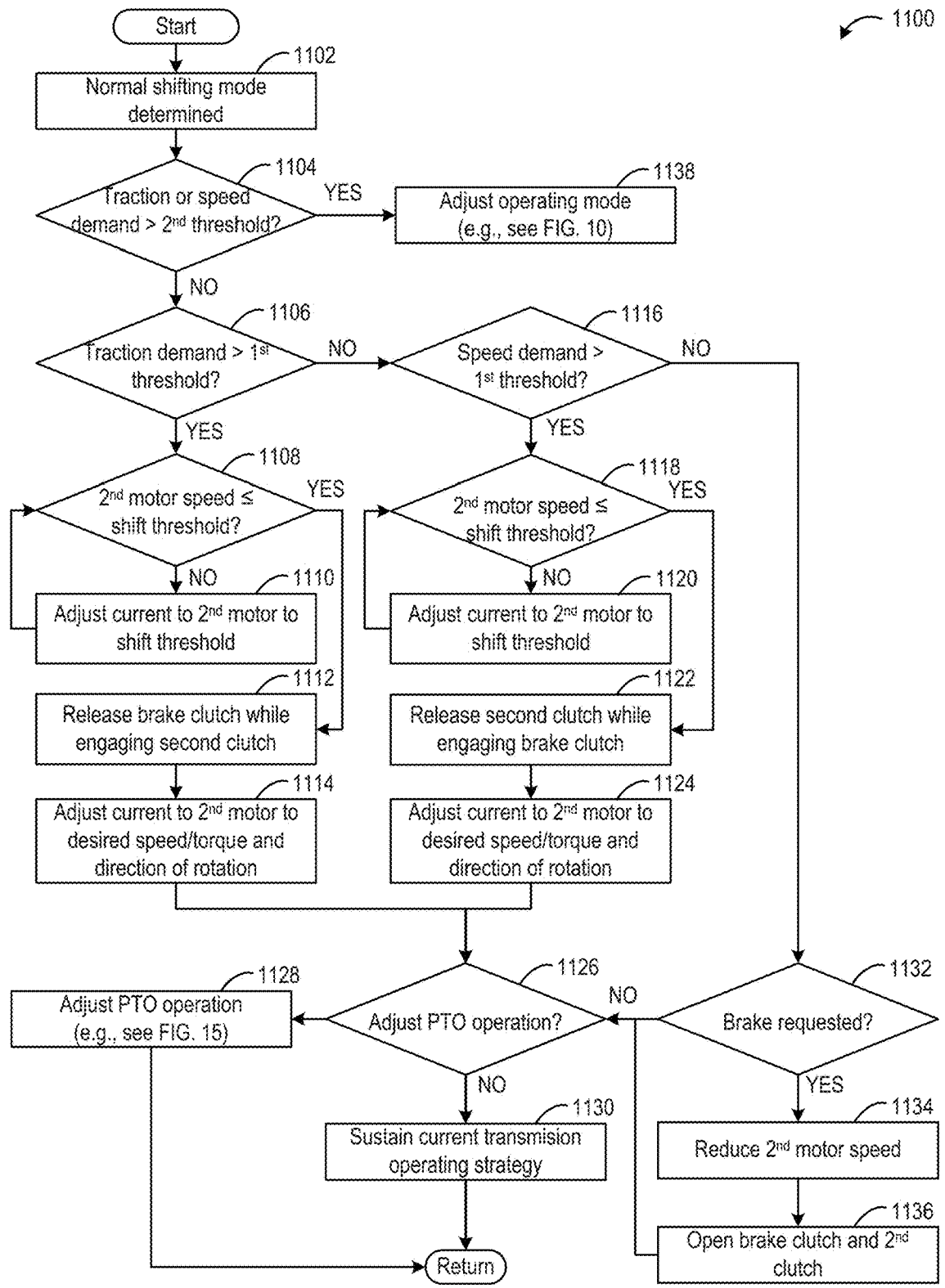
FIG. 11 shows a flow chart illustrating a second example method for a dual motor transmission.
Figure 12:
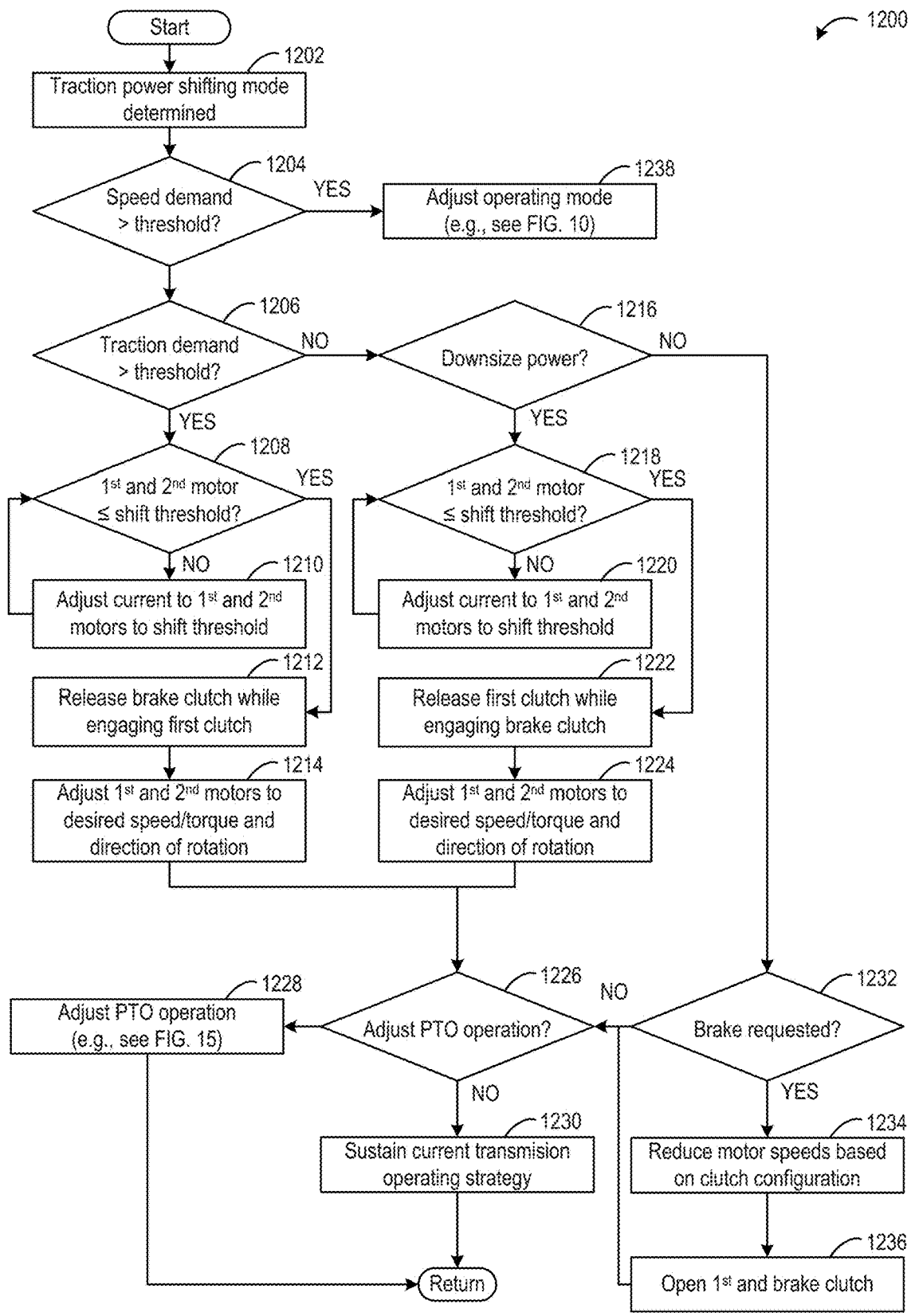
FIG. 12 shows a flow chart illustrating a third example method for a dual motor transmission.
Figure 13:
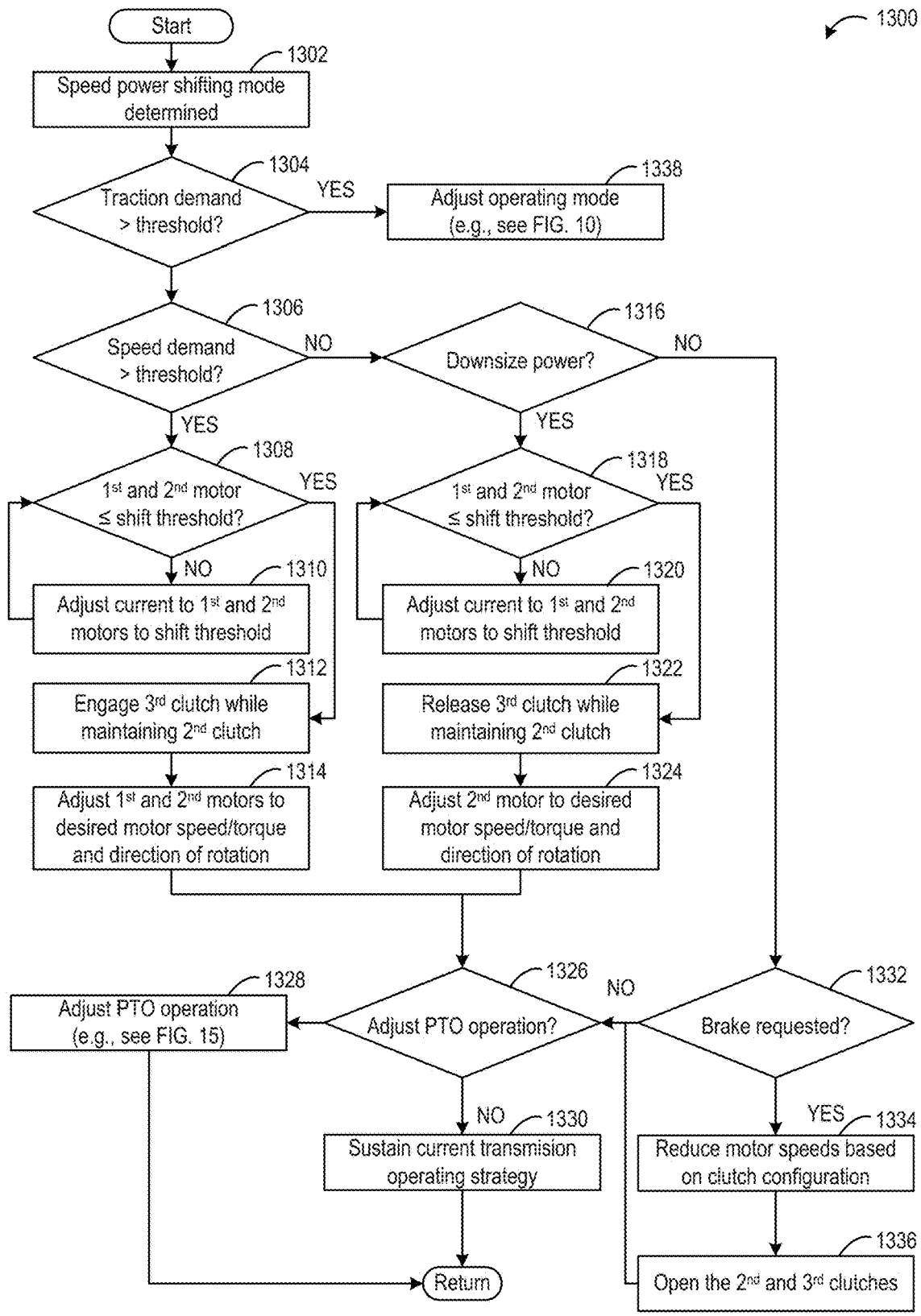
FIG. 13 shows a flow chart illustrating a fourth example method for a dual motor transmission.
Figure 14:
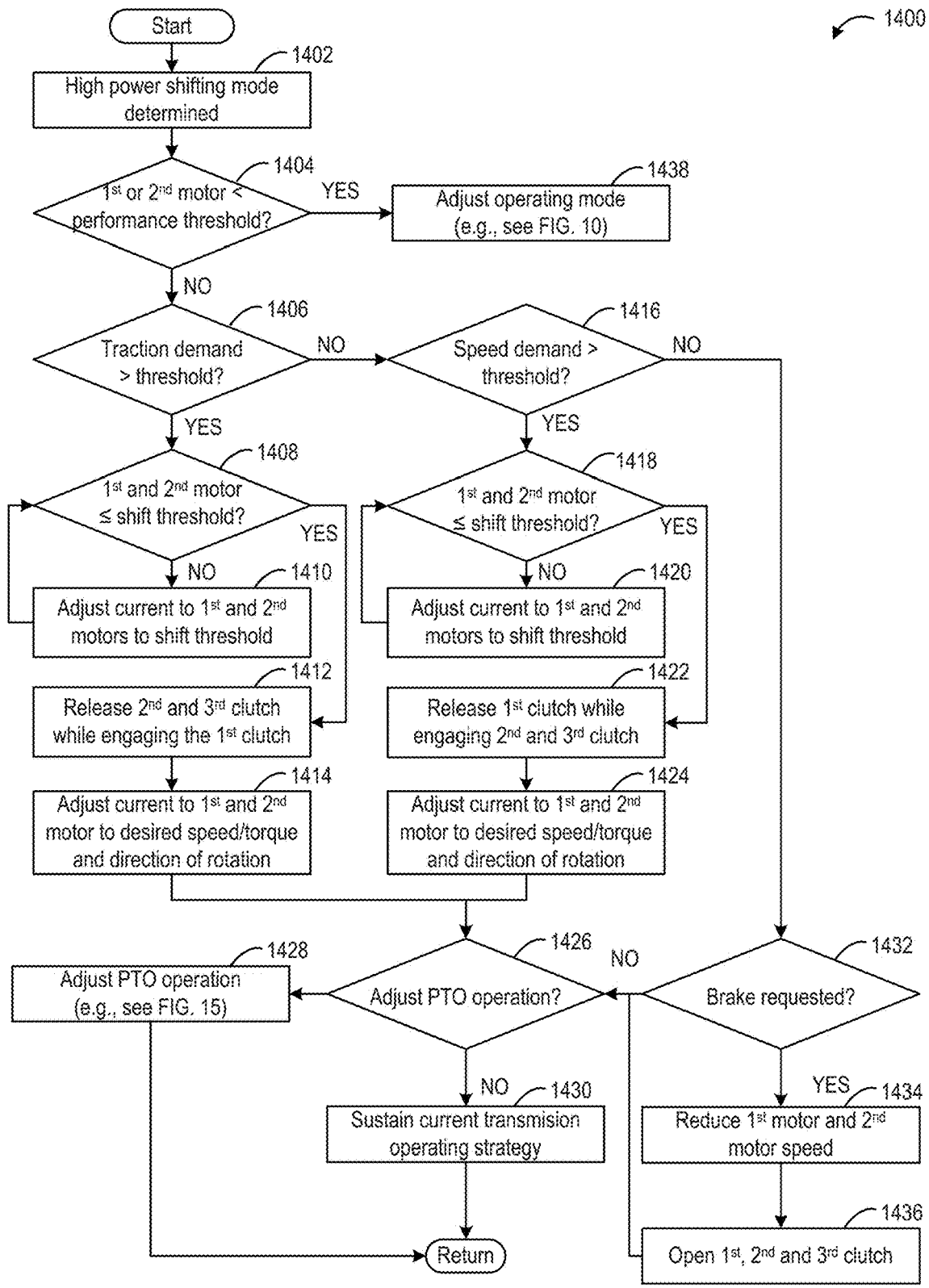
FIG. 14 shows a flow chart illustrating a fifth example method for operating mode and gear selection in a dual motor transmission.
Figure 15:
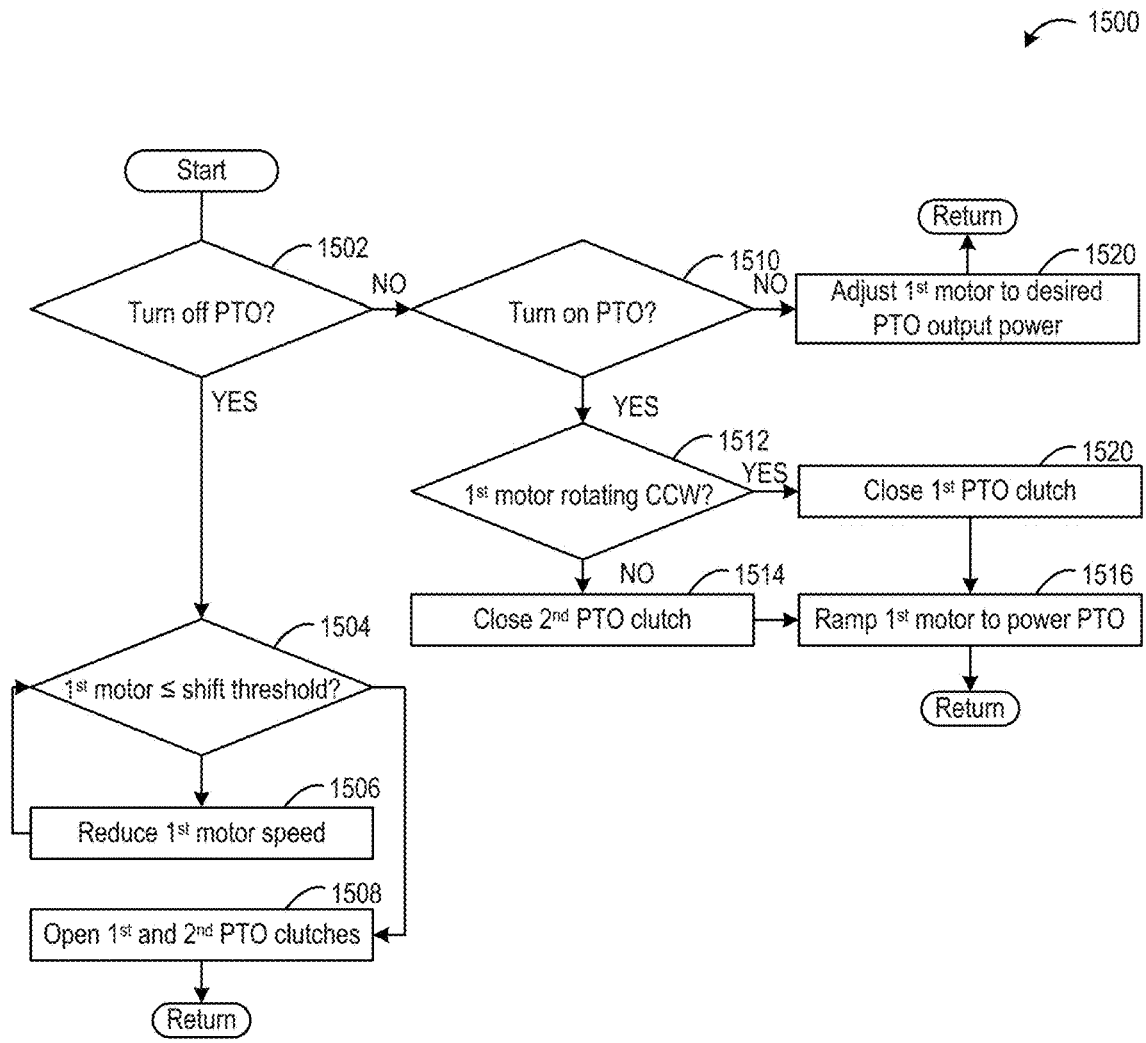
FIG. 15 shows a flow chart illustrating a sixth example method for operating mode and gear selection in a dual motor transmission.
Figure 16:
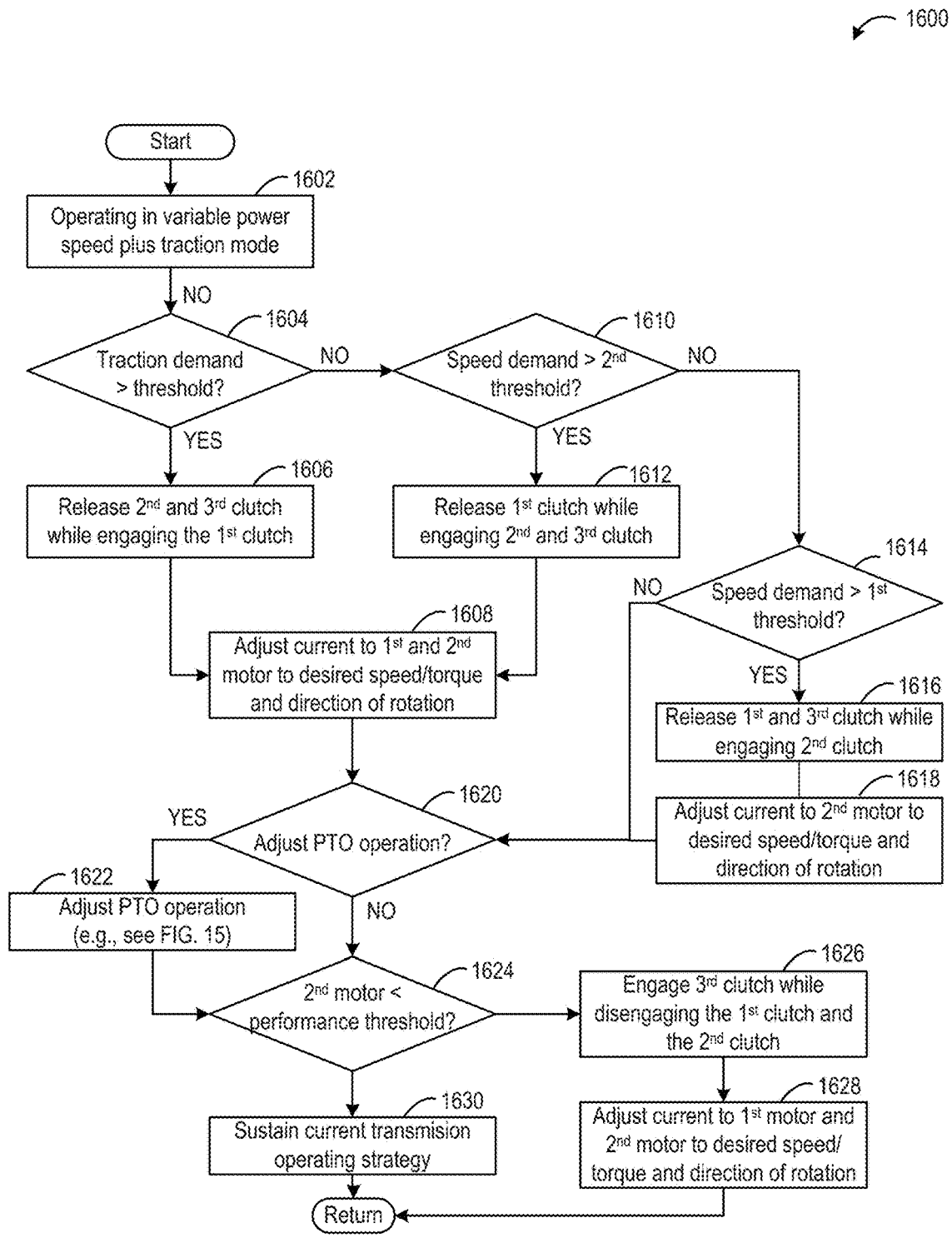
FIG. 16 shows a flow chart illustrating a seventh example method for operating mode and gear selection in a dual motor transmission.
Figure 17:
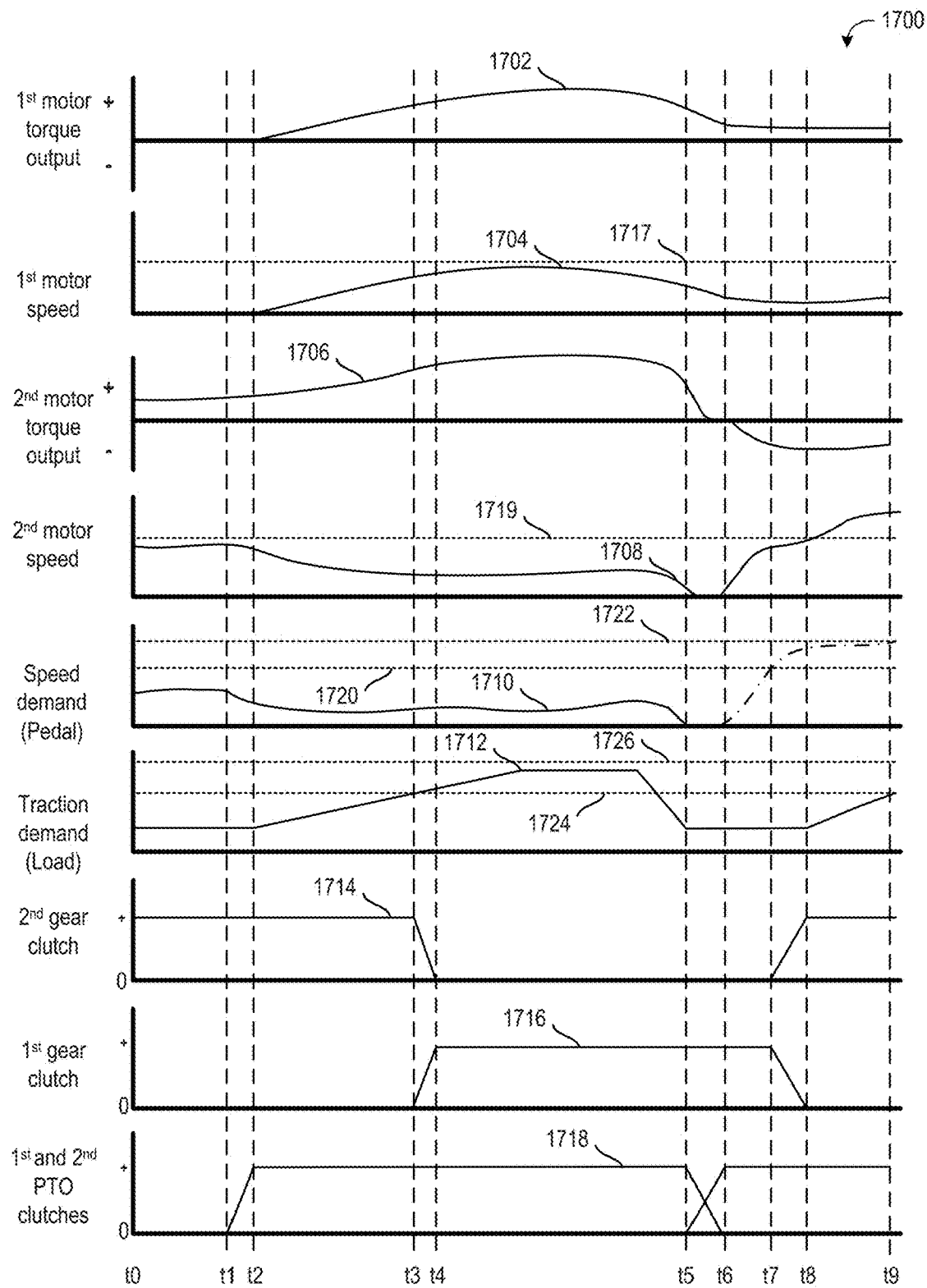
FIG. 17 shows a timing diagram illustrating a first prophetic example operation of the disclosed dual motor transmission.
Figure 18:
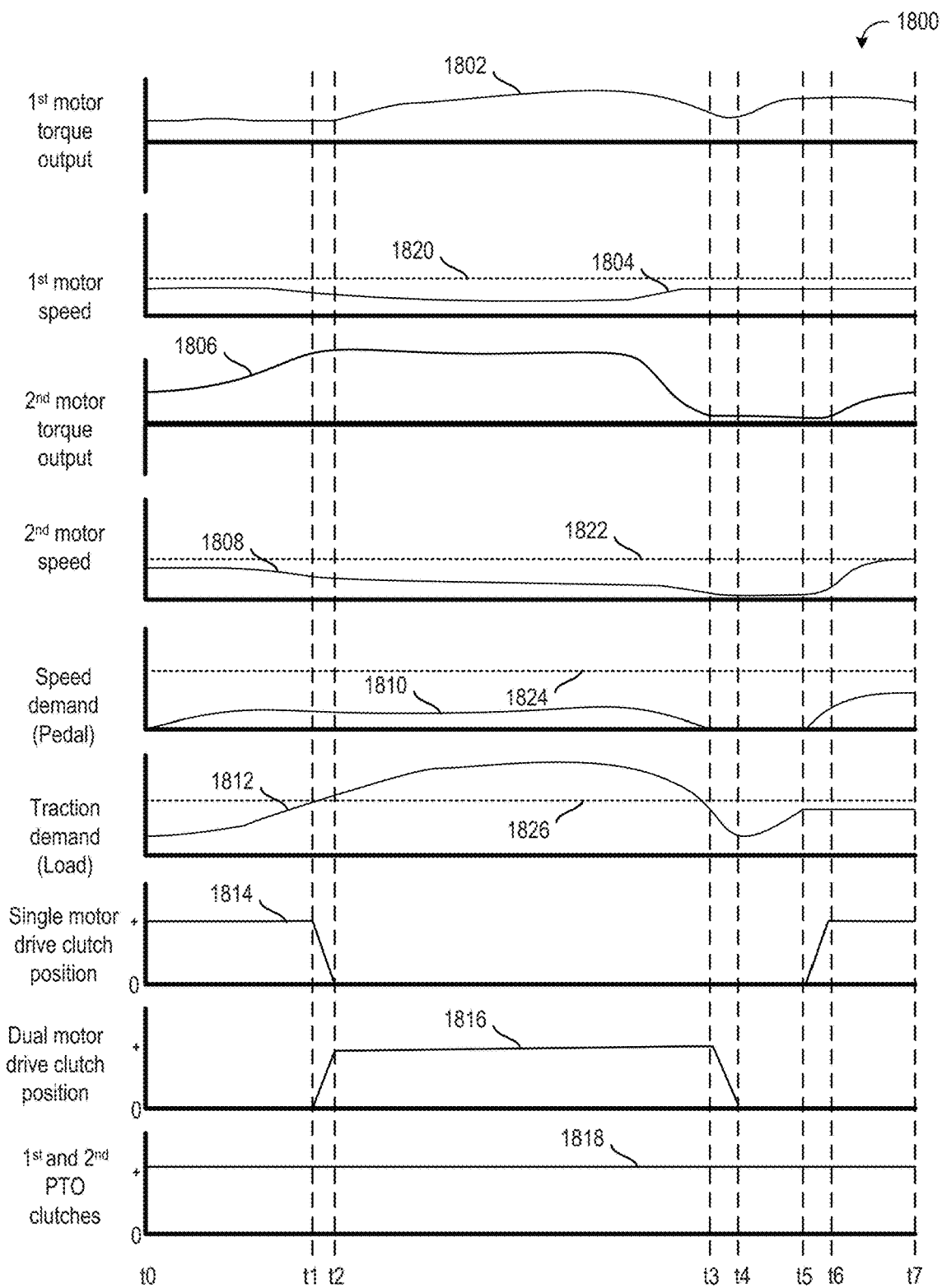
FIG. 18 shows a timing diagram illustrating a second prophetic example operation of the disclosed dual motor transmission.
Figure 19:
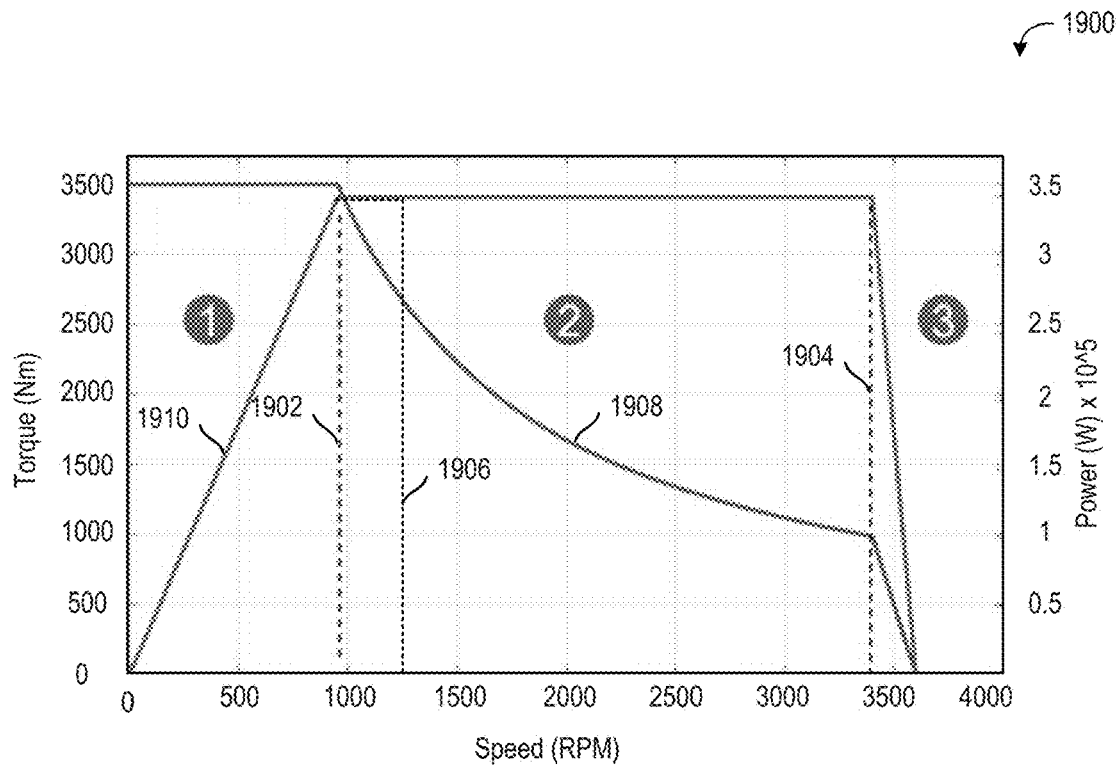
FIG. 19 shows a plot illustrating a relationship between torque, speed, and power in an electric transmission.
Figure 20:
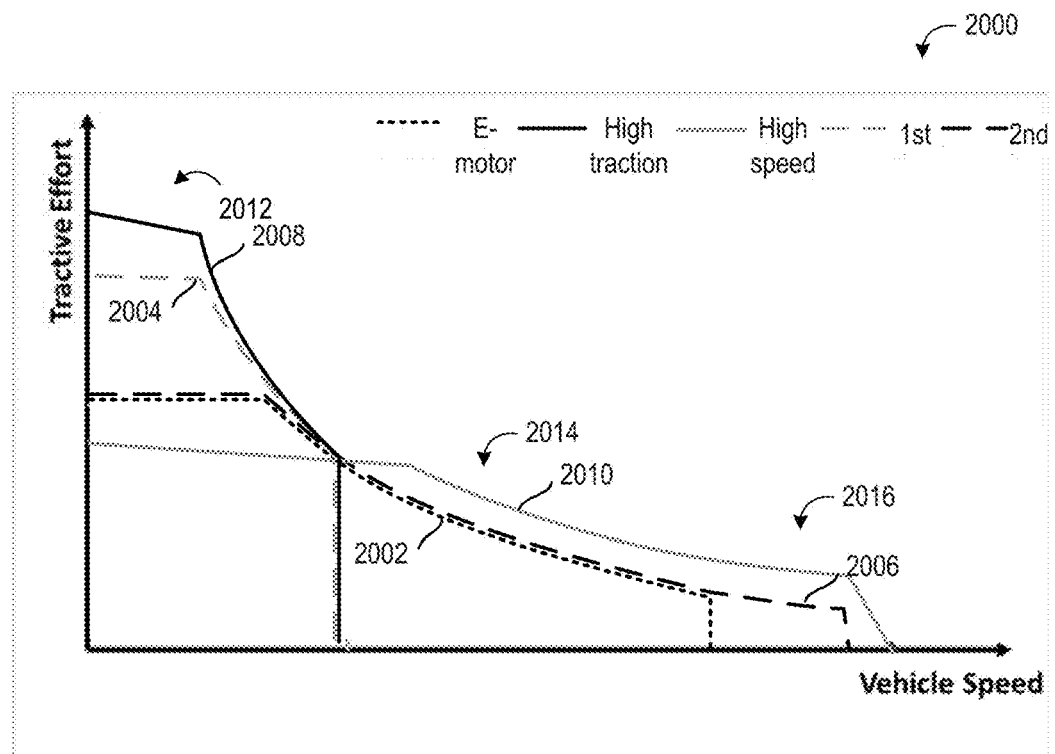
FIG. 20 shows a plot illustrating an example operating range of the disclosed dual motor transmission.

The dual motor transmission may be controlled to shift between the operating modes. An example method for selecting operating modes and gears for the dual motor transmission is shown in FIG. 10. FIG. 11 shows an example method for operating the dual motor transmission in a first shifting mode comprising shifting between first gear and second gear in single motor drive. FIG. 12 shows an example method for operating the dual motor transmission in a second shifting mode comprising shifting between single motor drive and dual motor drive in the first gear. FIG. 13 shows an example method for operating the dual motor transmission in a third shifting mode comprising shifting between single motor drive and dual motor drive in the second gear. FIG. 14 shows an example method for operating the dual motor transmission in a fourth shifting mode comprising shifting between first gear and second gear in dual motor drive. FIG. 15 shows an example method for operating the PTO unit of the disclosed transmission. FIG. 16 shows an example method for operating the dual motor transmission in a fifth shifting mode comprising shifting between single and dual motor drive in second gear, dual motor drive in first gear, and tow mode. FIG. 17 is a timing diagram illustrating a first prophetic example operation of the disclosed dual motor transmission. In the first prophetic example, the dual motor transmission is controlled to shift between first gear and second gear in single motor drive and operate a PTO device. FIG. 18 is a timing diagram illustrating a second prophetic example operation of the disclosed dual motor transmission. In the second prophetic example, the dual motor transmission is controlled to shift between single motor and dual motor drive in the first gear and operate a PTO device. FIGS. 19-20 are plots illustrating advantages of the dual motor transmission.

FIG. 1 shows an example configuration for a dual motor transmission 100 for a vehicle 101. The vehicle 101 may be a heavy-duty vehicle, such as, for example, a bulldozer, a loader, a garbage truck, an excavator, a hay baler, and so on. In one example, the dual motor transmission 100 includes a first motor 102 positioned on a first shaft 104 and a second motor 106 positioned on a second shaft 108. The first shaft 104 may be a first motor output shaft. The second shaft 108 may be a second motor output shaft. The speed and direction of the first motor 102 is controlled by a first inverter 110 and the second motor 106 is controlled by a second inverter 112. The first motor 102 and the second motor 106 may include conventional components such as a stator, rotor, rotor shaft, and the like to enable the electric motors to generate mechanical power and electrical energy. The first motor 102 and the second motor 106 may receive electrical power from a battery 178 to provide torque to a drive axle 130. In some examples, the first motor 102 and the second motor 106 may provide electrical power to the battery 178, such as, for example, when the first motor 102 and second motor 106 are designed for regeneration. A rotational axis 114 of the first motor 102, shown as dashed lines, is coaxial with the first shaft 104. A rotational axis 116 of the second motor 106, shown as dashed lines, is coaxial with the second shaft 108. A rotational axis 115 of the drive axle 130 is shown in dashed lines. In one example, the rotational axis 114, the rotational axis 116, and the rotational axis 115 are arranged in parallel.

The dual motor transmission 100 includes a plurality of clutches for shifting between operational modes and speeds. The plurality of clutches include a first wet clutch 122 positioned about and selectively coupled to the first shaft 104, a second wet clutch 124 positioned about and selectively coupled to the drive axle 130, a third wet clutch 126 positioned about and selectively coupled to the first shaft 104 and a brake clutch 128 fixed to a housing 190. The first wet clutch 122 and the third wet clutch 126 are coaxial with the first shaft 104. The first wet clutch 122 is arranged closer to the first motor 102 than the third wet clutch 126. The second wet clutch 124 is coaxial with the drive axle 130.

The first motor 102 and the second motor 106 are selectively coupled to the drive axle 130 via transmission gear train 132 comprising a planetary gearset 134, a plurality of drive gears, and a plurality of driven gears. The planetary gearset 134 comprises a sun gear 136 positioned on the second shaft 108, a planet carrier 138 selectively coupled to the third wet clutch 126, and a ring gear 140 selectively coupled to the first wet clutch 122 or to the brake clutch 128. The first wet clutch 122 may be operated to selectively engage the first shaft 104 with the planetary gearset 134 via a first drive gear 154. The third wet clutch 126 may be operated to selectively engage the first shaft 104 with the planetary gearset 134 via a third drive gear 160. The second wet clutch 124 may be operated to selectively engage the second shaft 108 with the drive axle 130 via a gear train 157 comprising a second drive gear 156 and a second driven gear 158. The brake clutch 128 may be operated to selectively engage the second shaft 108 with the drive axle 130 via the planetary gearset 134 and an output gear 162. The drive axle 130 may be coupled to drive wheels (not shown) via a first output flange 164 and a second output flange 166.

Two opposing one-way clutches selectively couple a PTO shaft 144 to the first shaft 104. A rotational axis 145 of the PTO shaft 144 is shown in dashed lines. A first one-way clutch 142 selectively couples the first shaft 104 to the PTO shaft 144 via a first gear train 146. A second one-way clutch 148 couples the PTO shaft 144 via a second gear train 150. The first one-way clutch 142 and the second one-way clutch 148 are coaxial with the first shaft 104. The first motor 102 is selectively mechanically coupled to the PTO 152 via the PTO shaft 144 by operation of one of the first one-way clutch 142 and the second one-way clutch 148. The PTO 152 may be driven by the clockwise or counterclockwise rotation of the first motor 102. In one example, when driven counter clockwise, the power path from the first motor 102 travels from the first shaft 104 through the first one-way clutch 142 to the PTO 152 via the first gear train 146. When driven clockwise, the power path from the first motor 102 travels from the first shaft 104 through the second one-way clutch 148 to the PTO 152 via the second gear train 150. The first gear train 146 comprises a first PTO drive gear 168 engaged with a first PTO driven gear 170. The second gear train 150 comprises a second PTO drive gear 172 engaged with a second PTO driven gear 174 via an idle gear shaft 176.

The dual motor transmission 100 may be electronically connected (e.g., wirelessly or wired) to a controller 180. The controller 180 may include a processor 182 operatively connected to a memory 184. The memory 184 may be a non-transitory computer-readable medium and may be configured to store executable instructions (e.g., computer executable code) to be processed by the processor 182 in order to execute one or more control methods, such as method 1000 illustrated in FIG. 10. The memory 184 may also be configured to store data received by the processor 182.

The controller 180 receives signals from a plurality of sensors 186 and employs a plurality of actuators 188 to adjust system operation based on the received signals and instructions stored on the memory 184 of the controller. Sensors 186 may include motor speed sensors, shaft/gear speed sensors, current sensors, temperature sensors, humidity sensors, and so on for monitoring the dual motor transmission 100. As another example, an input device 199 (e.g., accelerator pedal, brake pedal, gear selector, joystick, combinations thereof, and so on) may further provide input signals indicative of an operator's intent for vehicle control.

Upon receiving the signals from the sensors 186 of FIG. 1, the controller 180 processes the received signals, and employs the actuators 188 of vehicle components to adjust the components based on the received signals and instructions stored on the memory 184 of controller 180. For example, the controller 180 may receive a signal from the input device 199 indicative of an operator request for a vehicle acceleration adjustment. In response, the controller 180 may command operation of the second motor 106 to increase the power delivered from the second motor 106 to the drive axle 130. The controller 180 may, during certain operating conditions, be designed to send commands to the plurality of clutches and in response use clutch actuators to engage or disengage selected gears. For example, the control system may have instructions stored on the memory of the controller 180 that when executed cause the controller to select a mode of operation, such as an operating gear, and based on the mode of operation selected, the controller may adjust one or more of the first wet clutch 122, the second wet clutch 124, the third wet clutch 126, or the brake clutch 128 of the transmission gear train 132. The clutch actuators may include a first wet clutch actuator 122*a* for controlling a position of the first wet clutch 122, a second wet clutch actuator 124*a* for controlling a position of the second wet clutch 124, a third wet clutch actuator 126*a* for controlling a position of the third wet clutch 126, and a brake clutch actuator 128*a* for controlling a position of the brake clutch 128. The clutch actuators may further include a first one-way clutch actuator 142*a* for controlling a position of the first one-way clutch 142 and a second one-way clutch actuator 148*a* for controlling a position of the second one-way clutch 148. The controller 180 may detect clutch position from signals sent via a first wet clutch position sensor 122*b* for detecting the position of the first wet clutch 122, a second wet clutch position sensor 124*b* for detecting the position of the second wet clutch 124, a third wet clutch position sensor 126*b* for detecting the position of the third wet clutch 126, a brake clutch position sensor 128*b* for detecting the position of the brake clutch 128, a first one-way clutch position sensor 142*b* for detecting the position of the first one-way clutch 142, and a second one-way clutch position sensor 148*b* for detecting the position of the second one-way clutch 148. The other controllable components in the vehicle 101 may function in a similar manner with regard to sensor signals, control commands, and actuator adjustment, for example. As another example, the controller 180 may automatically adjust one or more clutch actuators based on signals from one or more traction sensors for monitoring wheel traction.

FIG. 2 shows a table 200 illustrating operating modes of the disclosed transmission, such as the dual motor transmission 100 described with reference to FIG. 1. In one example, the first clutch, the second clutch, the third clutch, and the fourth clutch may be the same or similar to the first wet clutch 122, the second wet clutch 124, the third wet clutch 126, and the brake clutch 128, respectively. The motors may be the first motor 102 and the second motor 106.

Table 200 depicts exemplary modes that may be realized by engaging one or more clutches. In one example, the modes may employ one or both motors to realize a first gear or a second gear. In one example, the first gear is F1/R1 and the second gear is F2/R2. The second gear ratio may be higher than the first gear ratio. In one example, the modes include a first operating mode, a second operating mode, a third operating mode, a fourth operating mode, and a tow mode. A filled box indicates engagement of the clutch with its respective shaft (e.g., first shaft 104, drive axle 130) or housing (e.g., housing 190). An unfilled box indicates disengagement of the clutch with the respective shaft or housing.

In one example, the first operating mode may be realized by actuating the brake clutch 128 to engage the second shaft 108 with the drive axle 130 via the planetary gearset 134. The first operating mode represents a single motor drive mode (also herein referred to as the normal mode) comprising powering, with only the second motor, rotation of the drive axle in the first gear at the first gear ratio. The second operating mode may be realized by actuating the second wet clutch 124 to engage the second shaft 108 with the drive axle 130 via the gear train 157. The second operating mode represents a single motor drive mode comprising powering, with only the second motor, rotation of the drive axle 130 in the second gear at the second gear ratio. The third operating mode, which is a dual motor high traction mode, includes actuating the first wet clutch 122 to engage the first shaft 104 with the drive axle 130 via the planetary gearset 134. The third mode comprises powering, with the first motor and the second motor, rotation of the drive axle 130 in the first gear at the first gear ratio. The fourth operating mode, which is a dual motor high speed mode, includes actuating the third wet clutch 126 to engage the first shaft 104 with the drive axle 130 via the planetary gearset 134 and the output gear 162, and actuating the second wet clutch 124 to engage the second shaft 108 with the drive axle 130 via the gear train 157. The fourth operating mode comprises powering, with the first motor and second motor, rotation of the drive axle in the second gear at the second gear ratio. The tow mode or single motor tow mode includes actuating the third wet clutch 126 to engage the first shaft 104 with the drive axle 130. The tow mode comprises powering, with only the first motor, rotation of the drive axle 130, for example, in response to an indication of degradation of the second motor.

A plurality of shifting modes may be provided in the dual motor transmission 100. In one example, a first shifting mode or normal shifting mode may include shifting between the first operating mode (e.g., single motor drive in first gear) and the second operating mode (e.g., single motor drive in second gear). The transmission can provide increased tractive power in the first shifting mode by shifting from second gear to first gear and increased speed by shifting from first gear to second gear. A second shifting mode may include power shifting to increase/reduce power in the first gear. For example, the transmission can power shift to increase/reduce power by shifting between the first mode and the third mode (e.g., dual motor first gear). A third shifting mode may include power shifting to increase/reduce power in the second gear. For example, the third shifting mode may include shifting between the second operating mode and the fourth operating mode (e.g., dual motor second gear). A fourth shifting mode may include high power tractive effort or high power speed by shifting between the third operating mode and the fourth operating mode. The transmission can provide power shifting in the second gear and high power traction in the first gear by shifting between the second, third, and fourth operating modes, for example.

The disclosed transmission provides flexible shifting modes (e.g., the first shifting mode, the second shifting mode, etc.) that may simplify control strategies. For example, in the first shifting mode, the control strategy may include shifting between first and second gear in single motor drive, and vice versa, and not include power shifting. In some examples, the disclosed transmission may be configured to include all three wet clutches and the brake clutch for the broadest heavy-duty applications. In other examples, the disclosed transmission may include fewer clutches and be tuned for the specific vehicle application. In some examples, a reduced number of clutches may increase efficiency for some applications. Example methods for controlling the disclosed transmission in various shifting modes are described with reference to FIGS. 11-16.

FIG. 3 shows a first operation 300 of the dual motor transmission 100. The first operation 300 may be the same or similar to the configuration of the transmission in the first operating mode described with reference to table 200 in FIG. 2. The first operating mode represents a single motor drive (e.g., normal) configuration wherein the second motor 106 generates tractive power for driving in the first gear.

In the first operation 300 of the dual motor transmission 100, the brake clutch 128, which is fixed to the housing 190, is actuated to couple the ring gear 140 thereto. With the brake clutch 128 actuated, a power path 302 travels from the second motor 106 through the second shaft 108 to the drive axle 130 via the planetary gearset 134. Specifically, the power path 302 travels from the sun gear 136 to the planet carrier 138, from the planet carrier 138 to the output gear 162 directly coupled thereto, and from the output gear 162 to the drive axle 130.

FIG. 4 shows a second operation 400 of the dual motor transmission 100. The second operation 400 may be the same or similar to the configuration of the transmission in the second operating mode described with reference to table 200 in FIG. 2. The second operation 400 represents a single motor drive (e.g., normal) configuration wherein the second motor 106 generates tractive power for driving in the second gear.

In the second operation 400 of the dual motor transmission 100, the second wet clutch 124 is actuated to couple the second drive gear 156 of the second shaft 108 with the drive axle 130. With the second wet clutch 124 actuated, a power path 402 travels from the second motor 106 to the second shaft 108, and from the second shaft 108 through engagement the second drive gear 156 to the second driven gear 158 directly coupled thereto to the drive axle 130.

FIG. 5 shows a third operation 500 of the dual motor transmission 100. The third operation 500 may be the same or similar to the configuration of the transmission in the third operating mode described with reference to table 200 in FIG. 2. The third operation 500 represents a dual motor drive configuration wherein the first motor 102 and the second motor 106 generate tractive power for driving in the first gear, also herein referred to as the dual motor high traction mode.

In the third operation 500 of the dual motor transmission 100, the first wet clutch 122 is actuated to couple the first shaft 104 to the ring gear 140. With the first wet clutch 122 actuated, a first power path 502 travels from the first motor 102 to the drive axle 130 via engagement of the first shaft 104 with the planetary gearset 134. Specifically, the first power path 502 travels from the first drive gear 154 to the ring gear 140, from the ring gear 140 to the planet carrier 138, from the planet carrier 138 to the output gear 162 directly coupled thereto, and from the output gear 162 to the drive axle 130. A second power path 504 travels from the second motor 106 to the drive axle 130 via the sun gear 136 positioned on the second shaft 108. Specifically, the second power path 504 travels from the sun gear 136 to the planet carrier 138, from the planet carrier 138 to the output gear 162 directly coupled thereto, and from the output gear 162 to the drive axle 130.

FIG. 6 shows a fourth operation 600 of the dual motor transmission 100. The fourth operation 600 may be the same or similar to the configuration of the transmission in the fourth operating mode described with reference to table 200 in FIG. 2. The fourth operation 600 represents a dual motor drive configuration wherein the first motor 102 and the second motor 106 generate tractive power for driving in the second gear, also herein referred to as dual motor high speed mode.

In the fourth operation 600, the third wet clutch 126 is actuated to couple the first shaft 104 to the planet carrier 138 and the second wet clutch 124 is actuated to couple the second drive gear 156 of the second shaft 108 with the drive axle 130. With the third wet clutch 126 actuated, a first power path 602 travels from the first motor 102 to the drive axle 130 via engagement of the first shaft 104 with the planet carrier 138. Specifically, the first power path 602 travels from the first motor 102 to the third drive gear 160 via the first shaft 104, from the third drive gear 160 to planet carrier 138, from the planet carrier 138 to the output gear 162 directly coupled thereto, and from the output gear 162 to the drive axle 130. With the second wet clutch 124 actuated, a second power path 604 travels from the second motor 106 to the second shaft 108, and from the second shaft 108 through engagement with the second drive gear 156 to the second driven gear 158 directly coupled thereto to the drive axle 130.

FIG. 7 shows a fifth operation 700 of the dual motor transmission 100. The fifth operation 700 may be the same or similar to the configuration of the transmission in the third mode described with reference to table 200 in FIG. 2. The fifth operation 700 represents a single motor drive configuration wherein the first motor 102 generates tractive power for driving, also herein referred to as single motor tow mode or tow mode.

In the fifth operation 700, the third wet clutch 126 is actuated to couple the first shaft 104 to the planet carrier 138. With the third wet clutch 126 actuated, a power path 702 travels from the first motor 102 to the drive axle 130 via engagement of the first shaft 104 with the planet carrier 138. Specifically, the power path 702 travels from the first motor 102 to the third drive gear 160 via the first shaft 104, from the third drive gear 160 to planet carrier 138, from the planet carrier 138 to the output gear 162 directly coupled thereto, and from the output gear 162 to the drive axle 130. In one example, the fifth operation 700 may be useful in examples where the second inverter 112 and/or the second motor 106 is degraded.

FIG. 8 and FIG. 9 show a first example 800 and a second example 900, respectively, illustrating power paths to the PTO 152 and drive axle 130 for the dual motor transmission 100. The first example 800 and the second example 900 depict the third operating mode described with reference to FIG. 2 and FIG. 5. The first example 800 and the second example 900 illustrate solutions for the condition wherein maximum tractive effort and PTO power is desired by an operator.

In the first example 800, the first inverter 110 controls the first motor 102 to rotate in a clockwise manner and the second motor 106 to rotate in a counter clockwise manner. With the first wet clutch 122 actuated, a power path 802 travels from the first motor 102 to the drive axle 130 via engagement of the first shaft 104 with the planetary gearset 134. The power path 802 travels from the second motor 106 to the drive axle 130 via the second shaft 108. To operate the PTO 152 with the first motor 102 rotating in the clockwise manner, the second one-way clutch 148 is actuated. A power path 804 travels from the first motor 102 to the PTO 152 through the second one-way clutch 148 to the second gear train 150, driving clockwise rotation of PTO shaft 144 and the PTO 152 coupled thereto.

In the second example 900, the first inverter 110 controls the first motor 102 to rotate in a counter clockwise manner and the second motor 106 to rotate in a counter clockwise manner. With the first wet clutch 122 actuated, a power path 902 travels from the first motor 102 to the drive axle 130 via engagement of the first shaft 104 with the planetary gearset 134. The power path 902 travels from the second motor 106 to the drive axle 130 via the second shaft 108. To operate the PTO 152 with the first motor rotating in the counter clockwise manner, the first one-way clutch 142 is actuated. A power path 904 travels from the first motor 102 to the PTO 152 through the first one-way clutch 142 to the first gear train 146, driving clockwise rotation of the PTO shaft 144 and the PTO 152 coupled thereto.

In this way, by operating one of the first one-way clutch 142 and the second one-way clutch 148 in response to the direction of rotation of the first motor 102, clockwise or counter clockwise rotation of the first motor 102 may drive the PTO 152 in a clockwise manner. Moreover, in the dual motor drive mode shown in the first example 800 and the second example 900, where high traction is demanded, some power from the first inverter may be added to the second inverter, which may reduce overload of the second inverter during a stall condition of high traction. The motors may provide high traction and high PTO power at the same time.

FIG. 10, FIG. 11, FIG. 12, FIG. 13, FIG. 14, FIG. 15, and FIG. 16 are flow charts illustrating a method 1000, a method 1100, a method 1200, a method 1300, a method 1400, a method 1500, and a method 1600, respectively, for a dual motor transmission having a PTO. As one example, the method 1000 and the other methods described herein correspond to a method of operation of the dual motor transmission 100 shown in FIGS. 1-9. The method 1000 shows an example strategy for transitioning between operating modes, such as the operating modes described with reference to FIG. 2. The methods 1100-1400, and 1600 describe example strategies for shifting between gears or power levels within shifting modes, such as the shifting modes described with reference to FIG. 2. The method 1500 describes an example strategy for adjusting PTO operation. In some examples, the methods 1000-1600 may be executed in an example of the disclosed transmission comprising the components described with reference to FIG. 1, such as, for example, the first wet clutch 122, the second wet clutch 124, the third wet clutch 126, the brake clutch 128, the first one-way clutch 142, and the second one-way clutch 148, for the broadest applications. In other examples, the methods 1000-1600 may executed by an example of the disclosed transmission, for example, having a subset of the aforementioned clutches and configured for a narrower application. Instructions for carrying out method 1000 and the other methods described herein may be executed by a controller based on instructions stored on a memory of the controller and in conjunction with signals received from sensors of the vehicle system, such as the sensors 186 described above with reference to FIG. 1. The controller may employ actuators of the vehicle system to adjust transmission operation, according to the method described below. Example actuators may include the actuators 188, the first wet clutch actuator 122a, the second wet clutch actuator 124a, the third wet clutch actuator 126a, the brake clutch actuator 128a, the first one-way clutch actuator 142a, and the second one-way clutch actuator 148a described above with respect to FIG. 1.

Turning to FIG. 10, a general strategy for operating mode and gear selection in the disclosed dual motor transmission is shown in the method 1000. At 1002, the method 1000 determines operating conditions. The operating conditions may include an input device position (e.g., gearshift lever position, accelerator pedal position, and the like), clutch configuration, vehicle speed, vehicle load, transmission load, motor speed, ambient temperature, and the like. The operating conditions may be ascertained via sensor inputs, modeling, look-up tables, and/or other suitable techniques. In one example, a clutch configuration may be ascertained via input from one or more clutch sensors, such as the first wet clutch position sensor 122b, the second wet clutch position sensor 124b, the third wet clutch position sensor 126b, the brake clutch position sensor 128b, the first one-way clutch position sensor 142b, and the second one-way clutch position sensor 148b described above with respect to FIG. 1.

At 1004, the method 1000 determines if an operating mode adjustment is desired. This determination may be automatically implemented based on motor speed, accelerator pedal position, brake pedal position, vehicle speed, vehicle load, and the like. Alternatively, this determination may be implemented responsive to operator interaction with a gear selector, such as the input device 199 described above with respect to FIG. 1.

If an operating mode adjustment is not desired, the method 1000 moves to 1022. If an operating mode adjustment is desired, the method 1000 moves to 1006. At 1006, the method 1000 selects a mode of operation based on vehicle operating conditions. For example, one mode of the four modes described with respect to table 200 in FIG. 2 may be selected. For instance, during conditions where more traction is desired, the transmission may shift to a mode in the first gear, such as the dual motor first gear mode or the normal mode in the first gear. During conditions where more vehicle speed is desired, the transmission may shift to a mode in the second gear, such the dual motor second gear mode, or the normal mode in the second gear. During conditions where the second motor is degraded, the transmission may shift to a single motor tow mode.

At 1008, the method 1000 refers to the clutch configuration for normal first gear: activating the brake clutch to engage the second motor with the drive axle via the planetary gearset (e.g., the brake clutch 128). At 1010, the method 1000 refers to the clutch configuration for normal second gear: activating the second wet clutch to engage the second motor with the drive axle via the gear train 157. At 1012, the method 1000 refers to the clutch configuration for dual motor first gear: activating the first wet clutch to engage the first motor and the second motor with the drive axle via the planetary gearset. At 1014, the method 1000 refers to the clutch configuration for dual motor second gear: activating the second and third wet clutches to engage the first motor with the drive axle via the planet carrier 138 and the second motor with the drive axle via the second drive gear. At 1016, the method 1000 refers to the clutch configuration for single motor tow: activating the third clutch to engage the first motor with the drive axle via the planet carrier. In one example, in each operating mode, only the active wet clutch is closed and the other wet clutches of the transmission are open.

At 1017, the method 1000 includes adjusting the first and/or second motor speed based on the selected mode. For example, transitioning from the normal mode to a dual motor drive mode, such as dual motor first gear, may include increasing or decreasing the first motor speed to within a threshold speed of the second motor so as to match the rotational speed of the first shaft and the second shaft when the shafts are connected to power the drive axle. For example, the second motor may be rotating at 900 RPM and the first motor may be increased to 900±50 RPM.

At 1018, the method 1000 includes adjusting the first wet clutch 122, the second wet clutch 124, the third wet clutch 126, and/or the brake clutch 128 based on the selected mode. As an example, the method 1000 may include transitioning between two of the operating modes. For example, the adjusting may include shifting from the normal mode in first gear to the dual motor mode in first gear. Adjusting from the normal mode in first gear to the dual motor mode in first gear may include adjusting the brake clutch to disengage with the housing and adjusting the first clutch to engage the first motor with the drive axle. Upon mode selection (e.g., automatic or operator-selected) an electronic signal may be sent to the brake clutch actuator 128a to disengage the brake clutch 128 coupling of the drive axle 130 with the second shaft 108 via the housing 190. At the same time, an electronic signal may be sent to the first wet clutch actuator 122a to engage the first wet clutch 122 coupling of the first shaft 104 with drive axle 130 via the planetary gearset 134. Methods for transitioning between operating modes within various exemplary shifting modes are described in greater detail with reference to FIGS. 11-16.

At 1020, the method 1000 includes adjusting the first motor and second motor to a desired speed or torque and direction of rotation based on the selected mode. For example, transitioning from the normal mode in first gear to the dual motor first gear mode may include ramping the first and second motor to a desired torque output. In one example, a control signal may be sent to the first inverter 110 and the second inverter 112 to ramp the first motor 102 and the second motor 106, respectively, to output 3000 Nm of torque.

At 1022, the method 1000 determines if output power to an auxiliary component is desired. This determination may be automatically implemented based on based on signals from one or more sensors such as for monitoring wheel traction, vehicle load, and the like. Alternatively, this determination may be implemented responsive to operator interaction with a control system interface. If output to an auxiliary component is not desired the method moves to 1034.

At 1034, the method 1000 includes sustaining the current transmission operating strategy. For instance, the transmission may remain in its current operating gear and the clutches therefore remain in their current position. If output to an auxiliary component is desired the method moves to 1024.

In response to determining output power to an auxiliary component is desired, the method 1000 determines whether the first motor is rotating counter clockwise at 1024.

If the first motor is rotating counter clockwise, the method 1000 includes closing the first one-way clutch at 1026. For example, an electronic signal may be sent to the first one-way clutch actuator 142a to engage the first shaft 104 with the PTO shaft 144 via the first gear train 146. If the first motor is not rotating counter clockwise, the method 1000 includes closing the second one-way clutch at 1028. For example, an electronic signal may be sent to the second one-way clutch actuator 148a to engage the first shaft 104 with the PTO shaft 144 via the second gear train 150, if the first motor is rotating clockwise, or not rotating.

At 1030, the method includes ramping the first motor to power the auxiliary device at the desired speed or torque. In one example, a control signal may be sent to the first inverter 110 to ramp the first motor 102 to run at 2000 RPM.

Turning to FIG. 11, a method 1100 for transitioning between first and second gear in the single motor drive is shown. For example, the method 1100 may be executed when the dual motor transmission 100 is controlled in the first operating mode and the second operating mode whereby the second motor 106 drives the drive axle 130 and the first motor 102 is disconnected from drive axle 130 and may selectively operate the PTO 152.

At 1102, the method 1100 includes determining the transmission is operating in the normal shifting mode. For example, a vehicle operator may select a shifting mode through an interface, such as by indicating via an input device position (e.g., gearshift lever position, accelerator pedal position, and the like). As another example, the shifting mode may be determined based on operating conditions, including an input device position, a clutch configuration, vehicle speed, vehicle load, transmission load, motor speed, ambient temperature, and the like. The shifting mode may be ascertained via sensor inputs, modeling, look-up tables, and/or other suitable techniques that may indicate operating conditions and/or vehicle operator selection.

At 1104, the method 1100 includes determining whether greater than a second threshold traction or speed demand is indicated. For example, a first threshold traction demand and a greater, second threshold traction demand may be non-zero positive value thresholds set for the vehicle. For example, the thresholds may be calibrated to transition the transmission between single and dual motor drive settings based on input from a sensor estimating load, power output, or wheel slippage, for example. In one example, the first threshold traction demand may be 2000 kilograms (kg) and the second threshold traction demand may be 5000 kg of estimated load. Similarly, a first threshold speed demand and a greater, second threshold speed demand may be non-zero positive value thresholds set for the vehicle. For example, the thresholds may be calibrated to transition the transmission between single and dual motor drive settings based on input from a pedal position sensor, for example. For example, the first threshold speed demand may be driver demand indicating a vehicle speed greater than 10 kph and the second threshold speed demand may be 25 kph.

In response to an indication of greater than second threshold traction or speed demand, the method 1100 may adjust the operating mode at 1138. For example, the transmission may be transitioned into a dual motor drive mode where more power may be directed to the greater load or vehicle speed demand. In one example, the method 1100 may direct to the method 1000 where the operating mode may be selected and the transmission transitioned to the selected operating mode.

In response to an indication of traction or speed demand not greater than the second threshold, the method 1100 includes determining whether traction demand greater than the first threshold traction demand is indicated at 1106.

In response to an indication of traction demand greater than the first threshold traction demand, the method 1100 includes determining whether the second motor speed is equal to or less than the shift threshold at 1108. For example, the shift threshold may be non-zero positive value threshold that is calibrated for the transmission to ensure smooth clutch engagement with minimal wear. In one example the shift threshold may be an upper limit of motor revolutions-per-minute (RPM) above which would may result in abrupt engagement, excessive wear, and/or stress on the transmission. For example, the shift threshold may be 2000 RPM. In other examples, for example, based on the specific configuration of the transmission, the method may proceed directly to adjusting the brake clutch and the second clutch at 1112.

In response to an indication of second motor speed greater than the shift threshold, the method 1100 includes adjusting current to the second motor to target the shift threshold at 1110. For example, the controller may transmit a control signal to the second inverter specifying the desired motor speed (e.g., 2000 RPM). In response, the second inverter may adjust current supplied to the second motor to target the shift threshold. The method 1100 may return to 1108 to determine whether the second motor speed is less than or equal to the shift threshold.

In response to an indication of second motor speed less than or equal to the shift threshold, the method 1100 includes releasing the brake clutch while engaging the second clutch at 1112. For example, the controller may transmit a first control signal to the brake clutch actuator 128a to open the brake clutch 128 and a second control signal to the second wet clutch actuator 124a to close the second wet clutch 124.

At 1114, the method 1100 includes adjusting current to the second motor to a desired speed or torque and direction of rotation. For example, the desired motor speed or motor torque may be based on an input signal such as a pedal position, a wheel slippage signal, or increased load. Direction of rotation (e.g., clockwise, or counterclockwise) may be determined based on an indication to drive forward or reverse.

Returning to 1106, in response to an indication of traction demand not greater than the first threshold traction demand, the method 1100 includes determining whether speed demand greater than the first threshold speed demand is indicated at 1116.

In response to an indication of vehicle speed demand greater than the first threshold speed demand, the method 1100 includes determining whether the second motor speed is equal to or less than the shift threshold at 1118. As above, in one example, the shift threshold may be non-zero positive value threshold that is calibrated for the transmission to ensure smooth clutch engagement with minimal wear, e.g., the shift threshold may be 2000 RPM. In other examples, such as, for example, based on the specific configuration of the transmission, the method may proceed directly to adjusting the brake clutch and the second clutch at 1122.

In response to an indication of second motor speed greater than the shift threshold, the method 1100 includes adjusting current to the second motor to target the shift threshold at 1120. As above, for example, the controller may transmit a control signal to the second inverter specifying the desired motor speed (e.g., 2000 RPM) and the second inverter may adjust the current to the second motor to target the shift threshold. The method 1100 may return to 1118 to determine whether the second motor speed is less than or equal to the shift threshold.

In response to an indication of second motor speed less than or equal to the shift threshold, the method 1100 includes releasing the second clutch while engaging the brake clutch at 1122. For example, the controller may transmit a first control signal to the second wet clutch actuator 124a to open the second wet clutch 124 and a second control signal to the brake clutch actuator 128a to close the brake clutch 128.

At 1124, the method includes adjusting current to the second motor to a desired motor speed or motor torque and direction of rotation. For example, the desired motor speed or motor torque may be based on an input signal such as a pedal position, a wheel slippage signal, or increased load. Direction of rotation (e.g., clockwise, or counterclockwise) may be determined based on an indication to drive forward or reverse.

Returning to 1116, in response to an indication of speed demand not greater than the first threshold speed demand, the method 1100 includes determining whether a brake request is indicated at 1132. In response to an indication of no brake request, the method 1100 includes determining whether adjusting the PTO operation is indicated at 1126

In response to a brake request, the method 1100 includes reducing the second motor speed at 1134. For example, the second motor speed may be reduced to target the shift threshold as described above. In one example, the method may include determining whether the second motor speed is less than or equal to the shift threshold as described above. In other examples, the method may proceed directly to opening the brake clutch and the second clutch at 1136.

At 1136, the method includes opening the brake clutch and the second clutch to disconnect the second motor from the drive axle. For example, the controller may transmit a first control signal to the second wet clutch actuator 124a to open the second wet clutch 124 and a second control signal to the brake clutch actuator 128a to open the brake clutch 128. In this way, the transmission may operate in brake mode or parking mode, while at the same time, the first motor may be controlled to drive the PTO.

At 1126, the method 1100 includes determining whether adjusting the PTO operation is indicated. For example, adjusting PTO operation may be indicated based on vehicle operator input, such as via the input device 199, or based on operating conditions, such as conditions of the first motor and/or second motor including speed, temperature, torque, etc. If adjusting the PTO is indicated, the method 1100 may include performing a control method to adjust PTO operation at 1128. An example control method for adjusting PTO operation is described with reference to FIG. 15.

In response to an indication of no PTO adjustment operation, the method 1100 includes sustaining the current transmission operating strategy at 1130. For instance, the transmission may remain in its current operating gear and the clutches and PTO operation therefore remain in their current position.

Turning to FIG. 12, a method 1200 for operating the disclosed transmission in a traction power shifting mode is shown. For example, operating in the traction power shifting mode may include transitioning between single motor drive and dual motor drive in the first gear. For example, the method 1200 may be executed when the dual motor transmission 100 is controlled in the first operating mode whereby the second motor 106 drives the drive axle 130 in the first gear via engagement of the brake clutch 128 and in the third operating mode, whereby the first motor 102 and the second motor 106 are coupled to the drive axle 130 in the first gear via engagement of the first wet clutch 122. In the traction power shifting mode, the first motor may selectively power the PTO as desired by the vehicle operator whether driving the transmission in single motor drive or dual motor drive.

At 1202, the method 1200 includes determining the transmission is operating in the traction power shifting mode. For example, a vehicle operator may select the shifting mode through an interface, such as by indicating via an input device position (e.g., gearshift lever position, accelerator pedal position, and the like). As another example, the shifting mode may be determined based on operating conditions, including an input device position, a clutch configuration, vehicle speed, vehicle load, transmission load, motor speed, ambient temperature, and the like. The shifting mode may be ascertained via sensor inputs, modeling, look-up tables, and/or other suitable techniques that may indicate operating conditions and/or vehicle operator selection.

At 1204, the method 1200 includes determining whether greater than threshold speed demand is indicated. In one example, greater than threshold speed demand may be a non-zero positive value threshold set for the vehicle that may be calibrated to transition the transmission out of the traction power shifting mode. In one example, the greater than threshold speed demand may be determined based on input from a pedal position sensor, for example, such as driver demand indicating a vehicle speed 10 km/hr. In some examples, the transmission may be transitioned out of the traction power shifting mode in response to surpassing one or more additional or alternative thresholds, such as a gradient threshold (e.g. measured by an accelerometer) or a load threshold indicating a lighter load.

In response to an indication of greater than threshold speed demand, the method 1200 may adjust the operating mode at 1238. For example, the transmission may be transitioned into a speed power shifting mode where more power may be directed to the greater vehicle speed demand or the normal shifting mode where single motor drive can generate higher motor RPMs. In one example, the method 1200 may direct to the method 1000 where the operating mode may be selected and the transmission transitioned to the selected operating mode.

In response to an indication of speed demand not greater than the speed threshold, the method 1200 includes determining whether traction demand greater than a threshold traction demand is indicated at 1206. In one example, the threshold traction demand may be a non-zero positive value threshold set for the vehicle that may be calibrated to transition the transmission into dual motor drive. In one example, the greater than threshold traction demand may be determined based on input from a sensor estimating load, for example. In one example, the threshold traction demand may be 5000 kg of estimated load. In some examples, the transmission may be transitioned into dual motor drive in response to surpassing one or more additional or alternative thresholds, such as, for example, a threshold power output, a threshold wheel slippage, and a threshold gradient or incline.

In response to an indication of traction demand greater than the threshold traction demand, the method 1200 includes determining whether the first motor and second motor speeds are equal to or less than the shift threshold at 1208. For example, the shift threshold may be non-zero positive value threshold that is calibrated for the transmission to ensure smooth clutch engagement with minimal wear. In one example the shift threshold may be an upper limit of motor revolutions-per-minute (RPM) above which may result in abrupt engagement, excessive wear, and/or stress on the transmission. For example, the shift threshold may be 2000 RPM. Additionally or alternatively, the shift threshold may be a threshold RPM difference between the first motor and the second motor that is calibrated to synchronize first and second shaft speeds before clutch engagement.

In response to an indication of the first motor and second motor speed greater than the shift threshold, the method 1200 includes adjusting current to one or both of the first motor and the second motor to target the shift threshold at 1210. For example, the controller may transmit a control signal to the first inverter and the second inverter specifying the desired motor speed (e.g., 2000 RPM). In response, the first inverter and the second inverter may adjust current supplied to the first motor and the second motor, respectively, to target the shift threshold. The method 1200 may return to 1208 to determine whether the first motor and second motor speeds are less than or equal to the shift threshold.

In response to an indication of the first motor and second motor speeds less than or equal to the shift threshold, the method 1200 includes releasing the brake clutch while engaging the first clutch at 1212. For example, the controller may transmit a first control signal to the brake clutch actuator 128*a* to open the brake clutch 128 and a second control signal to the first wet clutch actuator 122*a* to close the first wet clutch 122.

At 1214, the method 1200 includes adjusting current to the first motor and the second motor to a desired speed or torque and direction of rotation. For example, the desired motor speed or motor torque may be based on an input signal such as a pedal position, a wheel slippage signal, or increased load. Direction of rotation (e.g., clockwise, or counterclockwise) may be determined based on an indication to drive forward or reverse.

Returning to 1206, in response to an indication of traction demand not greater than the threshold traction demand, the method 1200 includes determining whether power downsizing is indicated at 1216. In some examples, power downsizing may be indicated based on one or more thresholds, such a threshold torque demand, threshold load, motor temperature, and so on. In some examples, power downsizing may be indicated by an operator input signal.

In response to an indication of power downsizing, the method 1200 includes determining whether the first motor and second motor speeds are equal to or less than the shift threshold at 1218. As above, in one example, the shift threshold may be non-zero positive value threshold that is calibrated for the transmission to ensure smooth clutch engagement with minimal wear, e.g., the shift threshold may be 2000 RPM. In other examples, such as, for example, based on the specific configuration of the transmission, the method may proceed directly to adjusting the brake clutch and the first clutch at 1222.

In response to an indication of the first motor and second motor speed greater than the shift threshold, the method 1200 includes adjusting current to one or both of the first motor and the second motor to target the shift threshold at 1220. For example, the controller may transmit a control signal to the first inverter and the second inverter specifying the desired motor speed (e.g., 2000 RPM). In response, the first inverter and the second inverter may adjust current supplied to the first motor and the second motor, respectively, to target the shift threshold. The method 1200 may return to 1218 to determine whether the first motor and second motor speeds are less than or equal to the shift threshold.

In response to an indication of the first motor and second motor speeds less than or equal to the shift threshold, the method 1200 includes releasing the first clutch while engaging the brake clutch at 1212. For example, the controller may transmit a first control signal to the first wet clutch actuator 122a to open the first wet clutch 122 and a second control signal to the brake clutch actuator 128a to close the brake clutch 128.

At 1224, the method 1200 includes adjusting current to the first motor and the second motor to a desired speed or torque and direction of rotation. For example, the desired motor speed or motor torque may be based on an input signal such as a pedal position, a wheel slippage signal, or increased load. Direction of rotation (e.g., clockwise, or counterclockwise) may be determined based on an indication to drive forward or reverse.

Returning to 1216, in response to no indication of power downsizing, the method 1200 includes determining whether a brake request is indicated at 1232. In response to an indication of no brake request, the method 1200 includes determining whether adjusting the PTO operation is indicated at 1226

In response to a brake request, the method 1200 includes reducing the first and second motor speeds based on the clutch configuration at 1234. For example, if the first clutch is engaged the first motor and second motor speeds may be reduced. However, if brake clutch is engaged, the second motor speed may be reduced and not the first motor speed. In one example, the method may include determining whether the first motor speed and second motor speed, or just the second motor speed, are less than or equal to the shift threshold as described above. In other examples, the method may proceed directly to opening the clutches at 1236.

At 1236, the method includes opening the first clutch and the brake clutch. For example, the controller may transmit a control signal to the first wet clutch actuator 122a to open the first wet clutch 122 and a second control signal to the brake clutch actuator 128a to open the brake clutch 128. In this way, the transmission may operate in brake mode or parking mode, while at the same time, the first motor may be controlled to drive the PTO.

At 1226, the method 1200 includes determining whether adjusting the PTO operation is indicated For example, adjusting PTO operation may be indicated based on vehicle operator input, such as via the input device 199, or based on operating conditions, such as conditions of the first motor and/or second motor including speed, temperature, torque, etc. If adjusting the PTO is indicated, the method 1200 may include performing a control method to adjust PTO operation at 1228. An example control method for adjusting PTO operation is described with reference to FIG. 15.

In response to an indication of no PTO adjustment operation, the method 1200 includes sustaining the current transmission operating strategy at 1230. For instance, the transmission may remain in its current operating gear and the clutches and PTO operation therefore remain in their current position.

Turning to FIG. 13, a method 1300 for operating the disclosed transmission in a speed power shifting mode is shown. For example, operating in the speed power shifting mode may include transitioning between single motor drive and dual motor drive in the second gear. For example, the method 1300 may be executed when the dual motor transmission 100 is controlled in the second operating mode whereby the second motor 106 drives the drive axle 130 in the second gear via engagement of the second wet clutch 124 or in the fourth operating mode whereby the first motor 102 and the second motor 106 are coupled to the drive axle 130 in the second gear via engagement of the second wet clutch 124 and the third wet clutch 126. In the speed power shifting mode, the first motor may selectively power the PTO as desired by the vehicle operator whether driving the transmission in single motor drive or dual motor drive.

At 1302, the method 1300 includes determining the transmission is operating in the speed power shifting mode. As described with reference to FIGS. 11-12, in some examples, the determination may be made variously, including, for example, a vehicle operator selection, based on one or more of the operating conditions, via sensor inputs, modeling, look-up tables, and/or other suitable techniques that may indicate operating conditions and/or the vehicle operator selection.

At 1304, the method 1300 includes determining whether greater than threshold traction demand is indicated. In one example, greater than threshold traction demand may be a non-zero positive value threshold set for the vehicle that may be calibrated to transition the transmission out of the speed power shifting mode. In one example, the greater than threshold traction demand may be determined based on input from a sensor estimating load, for example. In one example, the threshold traction demand may be 2000 kg of estimated load. In some examples, the transmission may be transitioned out of the traction power shifting mode in response to surpassing one or more additional or alternative thresholds, such as power output or wheel slippage.

In response to an indication of greater than threshold traction demand, the method 1300 may adjust the operating mode at 1338. For example, the transmission may be transitioned into a traction power shifting mode where more power may be directed to the greater vehicle traction demand or the normal shifting mode where single motor drive can transition between higher speed demand and higher traction demand. In one example, the method 1300 may direct to the method 1000 where the operating mode may be selected and the transmission transitioned to the selected operating mode.

In response to an indication of traction demand not greater than the traction threshold, the method 1300 includes determining whether speed demand greater than a threshold speed demand is indicated at 1306. In one example, greater than threshold speed demand may be a non-zero positive value threshold set for the vehicle that may be calibrated to transition the transmission into dual motor drive. In one example, the greater than threshold speed demand may be determined based on input from a pedal position sensor, for example, such as driver demand indicating a vehicle speed 25 km/hr.

In response to an indication of speed demand greater than the threshold speed demand, the method 1300 includes determining whether the first motor and second motor speeds are equal to or less than the shift threshold at 1308. For example, the shift threshold may be non-zero positive value threshold that is calibrated for the transmission to ensure smooth clutch engagement with minimal wear. In one example the shift threshold may be an upper limit of motor revolutions-per-minute (RPM) above which may result in abrupt engagement, excessive wear, and/or stress on the transmission. For example, the shift threshold may be 2000 RPM. Additionally or alternatively, the shift threshold may be a threshold RPM difference between the first motor and the second motor that is calibrated to synchronize first and second shaft speeds before clutch engagement.

In response to an indication of the first motor and second motor speed greater than the shift threshold, the method 1300 includes adjusting current to one or both of the first motor and the second motor to target the shift threshold at 1310. For example, the controller may transmit a control signal to the first inverter and the second inverter specifying the desired motor speed (e.g., 2000 RPM). In response, the first inverter and the second inverter may adjust current supplied to the first motor and the second motor, respectively, to target the shift threshold. The method 1300 may return to 1308 to determine whether the first motor and second motor speeds are less than or equal to the shift threshold.

In response to an indication of the first motor and second motor speeds less than or equal to the shift threshold, the method 1300 includes releasing the brake clutch while engaging the first clutch at 1312. For example, the controller may transmit a first control signal to the third wet clutch actuator 126a to open the third wet clutch 126 while maintaining engagement of the second wet clutch 124.

At 1314, the method 1300 includes adjusting current to the first motor and the second motor to a desired speed or torque and direction of rotation. For example, the desired motor speed or motor torque may be based on an input signal such as a pedal position or a torque load. Direction of rotation (e.g., clockwise, or counterclockwise) may be determined based on an indication to drive forward or reverse.

Returning to 1306, in response to an indication of speed demand not greater than the threshold speed demand, the method 1300 includes determining whether power downsizing is indicated at 1316. In some examples, power downsizing may be indicated based on one or more thresholds, such a lower threshold speed demand, motor temperature, and so on. In some examples, power downsizing may be indicated by an operator input signal.

In response to an indication of power downsizing, the method 1300 includes determining whether the first motor and second motor speeds are equal to or less than the shift threshold at 1318. As above, in one example, the shift threshold may be non-zero positive value threshold that is calibrated for the transmission to ensure smooth clutch engagement with minimal wear, e.g., the shift threshold may be 2000 RPM. In other examples, such as, for example, based on the specific configuration of the transmission, the method may proceed directly to adjusting the brake clutch and the first clutch at 1322.

In response to an indication of the first motor and second motor speed greater than the shift threshold, the method 1300 includes adjusting current to one or both of the first motor and the second motor to target the shift threshold at 1320. For example, the controller may transmit a control signal to the first inverter and the second inverter specifying the desired motor speed (e.g., 2000 RPM). In response, the first inverter and the second inverter may adjust current supplied to the first motor and the second motor, respectively, to target the shift threshold. The method 1300 may return to 1318 to determine whether the first motor and second motor speeds are less than or equal to the shift threshold.

In response to an indication of the first motor and second motor speeds less than or equal to the shift threshold, the method 1300 includes releasing the third clutch while maintaining engagement of the second clutch at 1312. For example, the controller may transmit a control signal to the third wet clutch actuator 126a to open the third wet clutch 126.

At 1324, the method 1300 includes adjusting current to the first motor and the second motor to a desired speed or torque and direction of rotation. For example, the desired motor speed or motor torque may be based on an input signal such as a pedal position or a torque load. Direction of rotation (e.g., clockwise, or counterclockwise) may be determined based on an indication to drive forward or reverse.

Returning to 1316, in response to no indication of power downsizing, the method 1300 includes determining whether a brake request is indicated at 1332. In response to an indication of no brake request, the method 1200 includes determining whether adjusting the PTO operation is indicated at 1326

In response to a brake request, the method 1300 includes reducing the first and second motor speeds based on the clutch configuration at 1334. For example, if the third clutch and the second clutch are engaged the first motor and second motor speeds may be reduced. However, if second clutch is engaged and the third clutch is open, the second motor speed may be reduced and not the first motor speed. In one example, the method may include determining whether the first motor speed and second motor speed, or just the second motor speed, are less than or equal to the shift threshold as described above. In other examples, the method may proceed directly to opening the clutches based on the clutch configuration at 1336.

At 1336, the method includes opening the second clutch and the third clutch to disconnect the first motor and the second motor from the drive axle. For example, the controller may transmit a first control signal to the third wet clutch actuator 126a to open the third wet clutch 126 and a second control signal to the second wet clutch actuator 124a to open the second wet clutch 124. In this way, the transmission may operate in brake mode or parking mode, while at the same time, the first motor may be controlled to drive the PTO.

At 1326, the method 1300 includes determining whether adjusting the PTO operation is indicated. For example, adjusting PTO operation may be indicated based on vehicle operator input, such as via the input device 199, or based on operating conditions, such as conditions of the first motor and/or second motor including speed, temperature, torque, etc. If adjusting the PTO is indicated, the method 1300 may include performing a control method to adjust PTO operation at 1328. An example control method for adjusting PTO operation is described with reference to FIG. 15.

In response to an indication of no PTO adjustment operation, the method 1300 includes sustaining the current transmission operating strategy at 1330. For instance, the transmission may remain in its current operating gear and the clutches and PTO operation therefore remain in their current position.

Turning to FIG. 14, a method 1400 for operating the disclosed transmission in a high power shifting mode is shown. For example, operating in the high power shifting mode may include transitioning between first gear and second gear in dual motor drive. For example, the method 1400 may be executed when the dual motor transmission 100 is controlled in the third operating mode whereby the first motor 102 and the second motor 106 are coupled to the drive axle 130 via engagement of the first clutch and the fourth operating mode whereby the first motor 102 and the second motor 106 are coupled to the drive axle 130 via engagement of the second wet clutch 124 and the third wet clutch 126 In the high power shifting mode, the first motor may selectively power the PTO as desired by the vehicle operator whether driving the transmission in first gear or second gear.

At 1402, the method 1400 includes determining the transmission is operating in the high power shifting mode. As described with reference to FIGS. 11-13, in some examples, the determination may be made variously, including, for example, a vehicle operator selection, based on one or more of the operating conditions, via sensor inputs, modeling, look-up tables, and/or other suitable techniques that may indicate operating conditions and/or vehicle operator selection.

At 1404, the method 1400 includes determining whether the first motor or the second motor are performing under a performance threshold. In one example, the performance threshold may be a non-zero positive value threshold set for the vehicle that may be calibrated to transition the transmission out of the high power shifting mode. In one example, the threshold performance may be determined based on input from a sensor, such as, for example, a heat sensor detecting motor overheating or an accelerometer detecting greater than a threshold vibration, or other means of detecting degraded performance such as poor acceleration and/or an inability to reach a speed or torque set point, an increase in a frequency of fuse tripping, and so on. In one example, the performance threshold may be a motor temperature indicating a temperature rise (e.g., over ambient) more than 60° C.

In response to an indication of less than threshold performance, the method 1400 may adjust the operating mode at 1438. For example, the transmission may be transitioned into the single drive tow mode where the first motor drives the drive axle or the single motor normal mode where the second motor drives the drive axle. In one example, the method 1400 may direct to the method 1000 where the operating mode may be selected and the transmission transitioned to the selected operating mode.

In response to an indication of better than threshold performance, the method 1400 includes determining whether traction demand greater than a threshold traction demand is indicated at 1406. In one example, the threshold traction demand may be a non-zero positive value threshold set for the vehicle that may be calibrated to transition the transmission into first gear of the dual motor drive. In one example, the greater than threshold traction demand may be determined based on input from a sensor estimating load, for example. In one example, the threshold traction demand may be 5000 kg of estimated load. In some examples, the threshold traction may be set based on other operating parameters. In some examples, the transmission may be transitioned into dual motor drive in response to surpassing one or more additional or alternative thresholds, such as, for example, a threshold power output, a threshold wheel slippage, and a threshold gradient or incline.

In response to an indication of traction demand greater than the threshold traction demand, the method 1400 includes determining whether the first motor and second motor speeds are equal to or less than the shift threshold at 1408. For example, the shift threshold may be non-zero positive value threshold that is calibrated for the transmission to ensure smooth clutch engagement with minimal wear. In one example the shift threshold may be an upper limit of motor revolutions-per-minute (RPM) above which may result in abrupt engagement, excessive wear, and/or stress on the transmission. For example, the shift threshold may be 2000 RPM. Additionally or alternatively, the shift threshold may be a threshold RPM difference between the first motor and the second motor that is calibrated to synchronize first and second shaft speeds before clutch engagement.

In response to an indication of the first motor and second motor speed greater than the shift threshold, the method 1400 includes adjusting current to one or both of the first motor and the second motor to target the shift threshold at 1410. For example, the controller may transmit a control signal to the first inverter and the second inverter specifying the desired motor speed (e.g., 2000 RPM). In response, the first inverter and the second inverter may adjust current supplied to the first motor and the second motor, respectively, to target the shift threshold. The method 1400 may return to 1408 to determine whether the first motor and second motor speeds are less than or equal to the shift threshold.

In response to an indication of the first motor and second motor speeds less than or equal to the shift threshold, the method 1400 includes releasing the second clutch and the third clutch while engaging the first clutch at 1412. For example, the controller may transmit a first control signal to the second wet clutch actuator 124a to open the second wet clutch 124, a second control signal to the third wet clutch actuator 126a to open the third wet clutch 126, and a third control signal to the first wet clutch actuator 122a to close the first wet clutch 122.

At 1414, the method 1400 includes adjusting current to the first motor and the second motor to a desired speed or torque and direction of rotation. For example, the desired motor speed or motor torque may be based on an input signal such as a pedal position or a torque load. Direction of rotation (e.g., clockwise, or counterclockwise) may be determined based on an indication to drive forward or reverse.

Returning to 1406, in response to an indication of traction demand not greater than the threshold traction demand, the method 1400 includes determining whether speed demand greater than a threshold speed demand is indicated at 1416. In one example, greater than threshold speed demand may be a non-zero positive value threshold set for the vehicle that may be calibrated to transition the transmission into the second gear of the dual motor drive. In one example, the greater than threshold speed demand may be determined based on input from a pedal position sensor, for example, such as driver demand indicating a vehicle speed 25 km/hr. In some examples, the threshold speed may be set based on the vehicle load or other operating parameters.

In response to an indication of power downsizing, the method 1400 includes determining whether the first motor and second motor speeds are equal to or less than the shift threshold at 1418. As above, in one example, the shift threshold may be non-zero positive value threshold that is calibrated for the transmission to ensure smooth clutch engagement with minimal wear, e.g., the shift threshold may be 2000 RPM. In other examples, such as, for example, based on the specific configuration of the transmission, the method may proceed directly to adjusting the brake clutch and the first clutch at 1422.

In response to an indication of the first motor and second motor speed greater than the shift threshold, the method 1400 includes adjusting current to one or both of the first motor and the second motor to target the shift threshold at 1420. For example, the controller may transmit a control signal to the first inverter and the second inverter specifying the desired motor speed (e.g., 2000 RPM). In response, the first inverter and the second inverter may adjust current supplied to the first motor and the second motor, respectively, to target the shift threshold. The method 1400 may return to 1418 to determine whether the first motor and second motor speeds are less than or equal to the shift threshold.

In response to an indication of the first motor and second motor speeds less than or equal to the shift threshold, the method 1400 includes releasing the first clutch while engaging the third clutch and the second clutch at 1414. For example, the controller may transmit a first control signal to the first wet clutch actuator 122*a* to open the first wet clutch 122, a second control signal to the second wet clutch actuator 124*a* to close the second wet clutch 124 and a third control signal to the third wet clutch actuator 126*a* to open the third wet clutch 126.

At 1424, the method 1400 includes adjusting current to the first motor and the second motor to a desired speed or torque and direction of rotation. For example, the desired motor speed or motor torque may be based on an input signal such as a pedal position or a torque load. Direction of rotation (e.g., clockwise, or counterclockwise) may be determined based on an indication to drive forward or reverse.

Returning to 1416, in response to no indication of greater than threshold speed demand, the method 1400 includes determining whether a brake request is indicated at 1432. In response to an indication of no brake request, the method 1400 includes determining whether adjusting the PTO operation is indicated at 1426.

In response to a brake request, the method 1400 includes reducing the first and second motor speeds at 1434. In one example, the method may include determining whether the first motor speed and second motor speed are less than or equal to the shift threshold as described above. In other examples, the method may proceed directly to opening the clutches at 1436.

At 1436, the method includes opening the first clutch, the second clutch, and the third clutch to disconnect the first motor and the second motor from the drive axle. For example, the controller may transmit a first control signal to the first wet clutch actuator 122*a* to open the first wet clutch 122, a second control signal to the second wet clutch actuator 124*a* to open the second wet clutch 124, and a third control signal to the third wet clutch actuator 126*a* to open the third wet clutch 126. In this way, the transmission may operate in brake mode or parking mode, while at the same time, the first motor may be controlled to drive the PTO.

At 1426, the method 1400 includes determining whether adjusting the PTO operation is indicated. For example, adjusting PTO operation may be indicated based on vehicle operator input, such as via the input device 199, or based on operating conditions, such as conditions of the first motor and/or second motor including speed, temperature, torque, etc. If adjusting the PTO is indicated, the method 1400 may include performing a control method to adjust PTO operation at 1428. An example control method for adjusting PTO operation is described with reference to FIG. 15.

In response to an indication of no PTO adjustment operation, the method 1400 includes sustaining the current transmission operating strategy at 1430. For instance, the transmission may remain in its current operating gear and the clutches and PTO operation therefore remain in their current position.

Turning to FIG. 15, a method 1500 for operating the PTO unit of the disclosed transmission is shown. For example, operating the PTO unit may include adjusting the PTO, including, but not limited to, turning the PTO unit on/off, activating the first PTO clutch or the second PTO clutch (e.g., the first one-way clutch 142, the second one-way clutch 148), and adjusting a power output of the first motor driving the PTO. In one example, the method 1500 may be executed in response to an indication to adjust the PTO operation, such as described with reference to FIGS. 11-14.

At 1502, the method 1500 determines whether an indication to turn off the PTO is desired. This determination may be implemented responsive to operator interaction with a control system interface. For example, a vehicle operator may indicate via the input device 199 a desire to turn off the PTO. Alternatively, the determination may be this automatically implemented based on based on signals from one or more sensors such as for monitoring load, and the like.

In response to an indication to turn off the PTO, the method 1500 includes determining whether the first motor speed is equal to or less than the shift threshold at 1504. As above, in one example, the shift threshold may be non-zero positive value threshold that is calibrated for the transmission to ensure smooth clutch engagement with minimal wear, e.g., the shift threshold may be 2000 RPM. In other examples, such as, for example, based on the specific configuration of the transmission, the method may proceed directly to opening the first and second PTO clutches at 1508.

In response to an indication of the first motor speed greater than the shift threshold, the method 1500 includes adjusting current to the first motor to target the shift threshold at 1506. For example, the controller may transmit a control signal to the first inverter specifying the desired motor speed (e.g., 2000 RPM). In response, the first inverter may adjust current supplied to the first motor to target the shift threshold. The method 1500 may return to 1508 to determine whether the first motor is less than or equal to the shift threshold.

At 1508, the method includes opening the first and second PTO clutches. For example, a first control signal may be sent to the first one-way clutch actuator 142*a* to open the first one-way clutch 142 and a second control signal may be sent to the second one-way clutch actuator 148*a* to open the second one-way clutch 148. In this way, power flow from the first motor 102 to the PTO shaft 144 is neither transmitted via the first gear train 146 nor the second gear train 150.

In response to determining an indication to turn off the PTO is not desired, the method includes determining whether an indication to turn on the PTO is desired at 1510. Similarly, this determination may be implemented responsive to operator interaction with a control system interface, such as via the input device 199, and additionally or alternatively, automatically implemented based on based on signals from one or more sensors.

In response to an indication to turn on the PTO, the method 1500 includes determining whether the first motor is rotating counter clockwise at 1512. If the first motor is rotating counter clockwise, the method includes closing the first PTO clutch at 1520. In one example, a first control signal may be sent to the first one-way clutch actuator 142*a* to open the first one-way clutch 142. If the first motor is not rotating counter clockwise, for example, the first motor is not rotating or the first motor is rotating clockwise, the method includes closing the second PTO clutch at 1514. In one example, a second control signal may be sent to the second one-way clutch actuator 148*a* to open the second one-way clutch 148.

At 1516, the method includes ramping the first motor to power the PTO. For example, the controller may transmit a control signal to the first inverter specifying a desired motor speed or torque, e.g., a setpoint. For example, the desired motor speed or torque may be determined based on an operating conditions such as determined via sensor input and/or operator input. In response, the first inverter may adjust current supplied to the first motor to target the speed or torque setpoint.

In response to determining an indication to turn on the PTO is not desired, the method 1500 includes adjusting the first motor to a desired PTO output power at 1520. For example, the controller may transmit a control signal to the first inverter specifying a desired motor speed or torque, e.g., a setpoint. In response, the first inverter may adjust current supplied to the first motor to target the speed or torque setpoint.

Turning to FIG. 16, a method 1600 for operating the disclosed transmission in a variable power speed plus traction shifting mode. For example, the method 1600 may be executed for transitioning between the dual motor drive mode and single motor drive mode in the second gear, the dual motor drive mode in the first gear, and the tow mode.

At 1602, the method 1600 includes determining the transmission is operating in the variable power speed plus traction shifting mode. As described with reference to FIGS. 11-14, in some examples, the determination may be made variously, including, for example, a vehicle operator selection, based on one or more of the operating conditions, via sensor inputs, modeling, look-up tables, and/or other suitable techniques that may indicate operating conditions and/or vehicle operator selection.

At 1604, the method 1600 includes determining whether greater than a threshold traction demand is indicated. In one example, the threshold traction demand may be a non-zero positive value threshold set for the vehicle that may be calibrated to transition the transmission into first gear of the dual motor drive. In one example, the greater than threshold traction demand may be determined based on input from a sensor estimating load, for example. In one example, the threshold traction demand may be 5000 kg of estimated load. In some examples, the threshold traction demand may be set based on other operating parameters. In some examples, the transmission may be transitioned into dual motor drive in response to surpassing one or more additional or alternative thresholds, such as, for example, a threshold power output, a threshold wheel slippage, and a threshold gradient or incline.

In response to an indication of greater than threshold traction demand, the method 1600 includes releasing the second wet clutch and the third wet clutch while engaging the first wet clutch at 1606. For example, the controller may transmit a first control signal to the second wet clutch actuator 124*a* to open the second wet clutch 124, a second control signal to the third wet clutch actuator 126*a* to open the third wet clutch 126, and a third control signal to the first wet clutch actuator 122*a* to close the first wet clutch 122. In some examples, as described with reference to FIGS. 10-15, the method may include determining whether the first motor and the second motor are rotating at less than a shift threshold prior to actuating the clutches. Additionally or alternatively, the shift threshold may be a threshold RPM difference between the first motor and the second motor that is calibrated to synchronize first and second shaft speeds before clutch engagement.

At 1608, the method 1600 includes adjusting current to the first motor and the second motor to a desired speed or torque and direction of rotation. For example, the desired motor speed or motor torque may be based on an input signal such as a pedal position, a wheel slippage signal, or increased load. Direction of rotation (e.g., clockwise, or counterclockwise) may be determined based on an indication to drive forward or reverse.

Returning to 1604, in response to an indication of traction demand not greater than the threshold traction demand, the method 1600 includes determining whether speed demand greater than a second threshold speed demand is indicated at 1610. The second threshold speed demand and a lower, first threshold speed demand may be non-zero positive value thresholds set for the vehicle. For example, the thresholds may be calibrated to transition the transmission between dual motor drive and single motor drive settings based on input from a pedal position sensor, for example. For example, the second threshold speed demand may be driver demand indicating vehicle speed greater than 25 kph and the first threshold speed demand may be greater than 10 kph.

In response to an indication of vehicle speed demand greater than the second threshold speed demand, the method 1600 includes releasing the first wet clutch while engaging the second wet clutch and the third wet clutch at 1612. For example, the controller may transmit a first control signal to the first wet clutch actuator 122*a* to close the first wet clutch 122, a second control signal to the second wet clutch actuator 124*a* to open the second wet clutch 124, and a third control signal to the third wet clutch actuator 126*a* to open the third wet clutch 126. In some examples, as described with reference to FIGS. 10-15, the method may include determining whether the first motor and the second motor are rotating at less than a shift threshold prior to actuating the clutches. Additionally or alternatively, the shift threshold may be a threshold RPM difference between the first motor and the second motor that is calibrated to synchronize first and second shaft speeds before clutch engagement.

At 1608, the method includes adjusting current to the second motor to a desired motor speed or motor torque and direction of rotation.

Returning to 1610, in response to an indication of speed demand not greater than the second threshold speed demand, the method 1600 includes determining whether speed demand greater than the first threshold speed demand is indicated at 1614.

In response to an indication of vehicle speed demand greater than the first threshold speed demand, the method 1600 includes releasing the first wet clutch and the third wet clutch while engaging the second wet clutch at 1616. For example, the controller may transmit a first control signal to the first wet clutch actuator 122a to open the first wet clutch 122, a second control signal to the third wet clutch actuator 126a to open the third wet clutch 126, and a third control signal to the second wet clutch actuator 124a to close the second wet clutch 124. In some examples, as described with reference to FIGS. 10-15, the method may include determining whether the first motor and the second motor are rotating at less than a shift threshold prior to actuating the clutches. Additionally or alternatively, the shift threshold may be a threshold RPM difference between the first motor and the second motor that is calibrated to synchronize first and second shaft speeds before clutch engagement.

At 1618, the method 1600 adjusting current to the second motor to a desired motor speed or motor torque and direction of rotation.

At 1620, the method 1600 includes determining whether adjusting the PTO operation is indicated. For example, adjusting PTO operation may be indicated based on vehicle operator input, such as via the input device 199, or based on operating conditions, such as conditions of the first motor and/or second motor including speed, temperature, torque, etc. If adjusting the PTO is indicated, the method 1600 may include performing a control method to adjust PTO operation at 1622. An example control method for adjusting PTO operation is described with reference to FIG. 15.

In response to an indication of no PTO adjustment operation, the method 1600 includes determining whether the second motor is performing under a performance threshold at 1624. In one example, the performance threshold may be a non-zero positive value threshold set for the vehicle that may be calibrated to transition the transmission into the tow mode. In one example, the threshold performance may be determined based on input from a sensor, such as, for example, a heat sensor detecting motor overheating or an accelerometer detecting greater than a threshold vibration, or other means of detecting degraded performance such as poor acceleration and/or an inability to reach a speed or torque set point, an increase in a frequency of fuse tripping, and so on. In one example, the performance threshold may be the second motor temperature indicating a temperature rise (e.g., over ambient) more than 60° C.

In response to an indication of the second motor performing under a performance threshold, the method 1600 includes releasing the first wet clutch and the second wet clutch while engaging the third wet clutch at 1606. For example, the controller may transmit a first control signal to the first wet clutch actuator 122a to open the first wet clutch 122, a second control signal to the second wet clutch actuator 124a to open the second wet clutch 124, and a third control signal to the third wet clutch actuator 126a to close the third wet clutch 126.

At 1628, the method 1600 adjusting current to the first motor and second motor to a desired motor speed or motor torque and direction of rotation. For example, the second motor may be ramped down to zero RPM and the first motor may be ramped up to a torque or a speed setpoint.

In response to an indication of the second motor performing above the performance threshold, the method 1600 includes sustaining the current transmission operating strategy at 1630. For instance, the transmission may remain in its current operating gear and the clutches and PTO operation therefore remain in their current position.

FIG. 17 and FIG. 18 are timing diagrams illustrating a sequence of actions performed within a control method for operating the disclosed dual motor transmission in a heavy duty vehicle, such as a loader, including operating the transmission to drive a PTO device, such as a loader bucket. The control method for motor torque shaping may be the same as or similar to the series of actions described above with reference to methods 1000, 1100, 1200, 1300, 1400 and 1500 in FIGS. 10-15, respectively. The dual motor transmission may be the same or similar to the dual motor transmission 100 shown in FIG. 1. Instructions for performing the control methods described in timing diagrams 1700 and 1800 may be executed by a controller (e.g., controller 180) based on instructions stored on a memory of the controller and in conjunction with sensory feedback received from components from a vehicle system (e.g., vehicle 101), including first motor and second motor speed sensors, torque sensors, wheel speed sensors, load sensors, and a pedal position sensor (e.g., sensors 186), clutch sensors including the first wet clutch position sensor 122b, the second wet clutch position sensor 124b, the third wet clutch position sensor 126b, the brake clutch position sensor 128b, the first one-way clutch position sensor 142b, and the second one-way clutch position sensor 148b, described above with reference to FIG. 1. In the prophetic examples, the controller determines whether operating conditions indicate a transition between gears and power levels is indicated, e.g., based on traction demand and speed demand thresholds, and whether PTO operation is desired. If a transition is indicated, the controller may execute a gear shifting or power shifting strategy based on the greater than threshold demand indicated. FIG. 17 depicts a scenario illustrating a control strategy with the vehicle in a normal shifting mode. FIG. 18 depicts a scenario illustrating a control strategy with the vehicle in traction power shifting mode. The horizontal (x-axis) denotes time and the vertical markers t0-t9 identify relevant times in timing diagrams 1700 and 1800 of FIGS. 17 and 18, respectively, for transmission control.

Timing diagram 1700 of FIG. 17 shows plots 1702, 1704, 1706, 1708, 1710, 1712, 1714, 1716, and 1718, which illustrate states of components and/or control settings of the vehicle system over time. Plot 1702 indicates a first motor torque output. Plot 1706 indicates a second motor torque output. First motor torque output and second motor torque output may be positive or negative. Plot 1704 indicates a first motor speed. A first shift threshold 1717 is indicated in plot 1704. The first shift threshold is a non-zero positive value threshold calibrated to smoothly actuate the first PTO clutch or the second PTO clutch with minimal wear on the transmission (e.g., 2000 RPM). Plot 1708 indicates a second motor speed. A second shift threshold 1719 is indicated in plot 1708. The second shift threshold 1719 is the same speed as the first shift threshold (e.g., 2000 RPM) and is calibrated to smoothly actuate the brake clutch or the second clutch with minimal wear on the transmission. Plot 1710 indicates a vehicle speed demand. A first threshold speed demand 1720 is indicated in plot 1710, which may be a non-zero positive value threshold calibrated to transition the transmission from first gear to second gear, such as, for example, 10 km/hr. A second threshold speed demand 1722 is indicated in plot 1710, which may be a non-zero positive value threshold calibrated to transition the transmission from the normal shifting mode, wherein the transmission may be adjusted between the first traction gear and the second traction gear in single motor drive, to another operating mode (e.g., a dual motor drive mode) or a different shifting mode, such as, the traction power shifting mode, the speed power shifting mode, or the high power shifting mode. The second threshold speed demand may be, for example, 25 km/hr. Plot 1712 indicates a vehicle traction demand. A first threshold traction demand 1724 is indicated in plot 1712, which may be a non-zero positive value threshold calibrated to transition the transmission from second gear to first gear, such as, for example, 2000 kg of load. A second threshold traction demand 1726 is indicated in plot 1712, which may be a non-zero positive value threshold calibrated to transition the transmission from the normal shifting mode, to another operating mode or a different shifting mode, such as, for example, 5000 kg of load. Plot 1714 indicates a second gear clutch position, which may be the second wet clutch 124. Plot 1716 indicates a first gear clutch position, which may be the brake clutch 128. Plot 1718 indicates a position of the first PTO clutch, which may be the first one-way clutch 142, and the second PTO clutch, which may be the second one-way clutch 148.

At t0, the transmission is operating in second gear having the second gear clutch engaged, as indicated in plot 1714, and the first gear clutch disengaged, as indicated in plot 1716. Vehicle speed demand is moderate in plot 1710 and less than the first threshold speed demand 1720. The vehicle speed demand is in the forward direction, as indicated by a solid line. Traction demand in plot 1712 is low and less than the first threshold traction demand 1724. Second motor torque is low and positive, as indicated in plot 1706, and second motor speed is higher, as indicated in plot 1708. The first motor is not operating.

From t0 to t1, the vehicle speed demand, traction demand, second motor torque output, and second motor speed are level. The second wet clutch remains engaged, as indicated in plot 1714. At t1, a manual indication via a button to operate the PTO to drive a loader bucket is received. As the first motor is not operating, the first motor speed is below the first shift threshold and not rotating counter clockwise. Consequently, from t1 to t2, the controller actuates the second PTO clutch actuator, as indicated in plot 1718, to drive the PTO shaft coupled to the loader bucket in a clockwise manner.

At t2, the second PTO clutch is engaged.

From t2 to t3, current to the first motor is adjusted to a desired torque output to operate the loader bucket. The first motor torque output and first motor speed increase, as indicated in plot 1702 and plot 1704, respectively, as the vehicle operator operates the loader bucket to move debris. As a result of the loader bucket operation, vehicle load increases as shown as increased traction demand, as indicated in plot 1712. The vehicle speed demand is constant, shown in plot 1710. The second motor torque output increases and the second motor speed reduces in response to the increased traction demand, as indicated in plot 1706 and plot 1708, respectively.

At t3, the traction demand crosses the first threshold traction demand. The second motor speed is below the second shift threshold. Consequently, from t3 to t4, the controller transitions the transmission out of second gear and into first gear. The controller sends a first control signal to the second gear clutch actuator (e.g., second wet clutch actuator 124a) to disengage the second gear clutch, as shown in plot 1714, and a second control signal to the first gear clutch actuator (e.g., the brake clutch actuator 128a) to engage the brake clutch, as shown in plot 1716.

At t4, the first gear clutch is engaged.

From t4 to t5, loader bucket operation continues at a high first motor torque output and low first motor speed, shown in plot 1702 and plot 1704, respectively. Current to the second motor ramps to generate increasing torque, as shown in plot 1706, in response to the increasing traction demand as a result of the loader bucket operation. Approaching t5, the vehicle speed steeply drops as the operator comes to a stop. In response, the second motor torque output reduces and the second motor speed reduces, as indicated in plot 1706 and in plot 1708, respectively. At the same time, the traction demand steeply drops as the load reduces in response to unloading the loader bucket. First motor torque output and first motor speed reduce in response to the unloading, as shown in in plot 1702 and in plot 1704, respectively.

At t5, the vehicle speed demand is reduced to zero as the operator prepares to reverse direction. To continue operating the PTO, the controller prepares to swap the PTO clutches to provide continuous clockwise rotation to the PTO shaft. The first motor speed is less than the first motor shift threshold. Consequently, from t5 to t6, the controller actuates the second PTO clutch actuator (e.g., second one-way clutch actuator 148a) to disengage the PTO shaft from the first motor via the second PTO clutch and the first PTO clutch actuator (e.g., first one-way clutch actuator 142a) to couple the PTO shaft to the first motor via the first PTO clutch, as shown in plot 1718. In this way, PTO operation may continue while the vehicle is operated in reverse.

At t6, the first PTO clutch is engaged.

From t6 to t7, the operator demands increased vehicle speed in a reverse direction, as indicated by a dot-dash line in plot 1710. Second motor torque increases in the negative direction and second motor speed increases towards the first threshold speed demand. Traction demand is level and low, as shown in plot 1712. The first motor is driving the PTO to the loader bucket at a low steady torque and motor speed, shown in plots 1702 and 1704, respectively.

At t7, the vehicle speed demand crosses the first threshold speed demand. The second motor speed is below the second shift threshold. Consequently, from t7 to 18, the controller transitions the transmission into second gear. The controller sends a first control signal to the brake clutch actuator to disengage the brake clutch and a second control signal to the second clutch actuator to engage the second clutch, shown in plot 1716 and in plot 1714, respectively.

At t8, the second clutch is engaged and the transmission is operating in second gear. From t8 to t9, current to the second motor ramps to increase second motor torque and second motor speed in response to the increasing vehicle speed demand. As second motor speed increases toward the second threshold speed demand, at the same time, second motor torque output levels off, shown in plot 1708 and in plot 1706, respectively.

At t9, the vehicle speed demand crosses the second threshold speed demand. As a result, the controller determines adjusting the operating mode is indicated. The timing diagram ends.

The example shown in the timing diagram 1700 illustrates a series of actions that may be performed while operating the dual motor transmission in the normal shifting mode to transition between first gear and second gear, where the second motor powers the drive axle (e.g., second motor 106) and the first motor selectively powers the PTO (e.g., first motor 102). A similar series of actions may be performed while operating the dual motor transmission in other shifting modes, such as, for example, the high power shifting mode described with reference to FIG. 14 and the variable power speed plus traction mode described with reference to FIG. 16. For example, in response to greater than threshold traction demand, the series of actions may include actuating the second gear clutch actuators (e.g., the second wet clutch actuator 124a, the third wet clutch actuator 126a) to disengage the second gear clutches (e.g., the second wet clutch 124, the third wet clutch 126) and actuating the first gear clutch actuator to engage the first gear clutch (e.g., the first wet clutch actuator 122a, the first wet clutch 122). In one example, the threshold traction demand may be the same or similar to the second threshold traction demand (e.g., 5000 kg) or different (e.g., see examples given with reference to FIG. 14). In response to greater than threshold vehicle speed demand, such as, greater than second threshold speed demand (e.g., 25 km/hr) or greater than first threshold speed demand (e.g., 10 km/hr), the series of actions may include transitioning the transmission to second gear in dual motor drive (e.g., the third operating mode) or transitioning the transmission to second gear in single motor drive (e.g., the second operating mode), respectively.

The timing diagram 1800 of FIG. 18 shows an example control strategy for the dual motor transmission comprising the traction power shifting mode such as described with reference to FIG. 2 and FIG. 12. Controlled in the traction power shifting mode, the vehicle operates in the first gear, selectively drives the drive axle with one or two motors, and selectively drives the PTO shaft to power a PTO device. Timing diagram 1800 shows plots 1802, 1804, 1806, 1808, 1810, 1812, 1814, 1816, and 1818 that illustrate states of components and/or control settings of the vehicle system over time. Plot 1802 indicates a first motor torque output. Plot 1806 indicates a second motor torque output. First motor torque output and second motor torque output may be positive or negative. Plot 1804 indicates a first motor speed. A first shift threshold 1820 is indicated in plot 1804. In one example, the first shift threshold 1820 is a non-zero positive value threshold calibrated to smoothly actuate clutches positioned on the first motor output shaft (e.g., 2000 RPM) with minimal wear on the transmission. For example, the first wet clutch 122 selectively coupling the first shaft 104 to the drive axle 130, and the first one-way clutch 142 and the second one-way clutch 148 selectively coupling the first shaft 104 to the PTO shaft 144. Plot 1808 indicates a second motor speed. A second shift threshold 1822 is indicated in plot 1808. The second shift threshold 1822 is the same speed as the first shift threshold (e.g., 2000 RPM) and is calibrated to smoothly actuate the brake clutch 128 with minimal wear on the transmission. Plot 1810 indicates a vehicle speed demand. A threshold speed demand 1824 is indicated in plot 1810, which may be a non-zero positive value threshold calibrated to transition the transmission from the traction power shift to another operating mode or a different shifting mode, such as, for example, 10 kph. Plot 1812 indicates a vehicle traction demand. A threshold traction demand 1826 is indicated in plot 1812, which may be a non-zero positive value threshold calibrated to transition the transmission from the single motor drive to dual motor drive, such as, for example, 5000 kg of load. Plot 1814 indicates a single motor drive clutch position, which may be the first wet clutch 122. Plot 1816 indicates a dual motor drive clutch position, which may be the brake clutch 128. Plot 1818 indicates a position of the first PTO clutch, which may be the first one-way clutch 142, and the second PTO clutch, which may be the second one-way clutch 148.

At t0, the loader is operating in traction single motor drive. The single motor drive clutch is engaged, shown in plot 1814, and the dual motor drive clutch is disengaged in 1816. The loader is stationary having a low speed demand, shown in plot 1810, and less than the threshold speed demand 1824. Traction demand is low and less than the threshold traction demand 1826, shown in in plot 1812. The second PTO clutch is engaged, as indicated in plot 1818, and driving a loader bucket at a low torque output.

From t0 to t1, the loader carries debris in the bucket up a slope increasing load and, as a result, traction demand increases, as indicated in plot 1812. Torque output at the second motor increases and motor speed at the second motor reduces slightly to fulfil the increasing traction demand, as shown in in plot 1806 and plot 1808, respectively. Torque output and motor speed at the first motor is level, as shown in plot 1802 and plot 1804, respectively.

At t1, the second motor reaches its peak torque output as the traction demand crosses the threshold traction demand, as indicated in plot 1812. The second motor speed is less than the second shift threshold and the first motor speed is less than the first shift threshold, as indicated in plot 1808 and in plot 1804, respectively. Additionally, the first shaft (e.g., coupled to the first motor) and the second shaft (e.g., coupled to the second motor) are rotating at similar speeds. Consequently, from t1 to t2, the controller transitions the transmission out of single motor drive and into dual motor drive. The controller sends a first control signal to the single motor drive clutch actuator (e.g., the brake clutch actuator 128a) to disengage the single motor drive clutch position in plot 1814 and a second control signal to the dual motor drive clutch actuator (e.g., the first wet clutch actuator 122a) to engage the dual motor drive clutch.

At t2, the dual motor drive clutch is engaged, as indicated in plot 1816. The loader is operating with dual motor drive wherein the power output from the first motor and the second motor is transmitted to the drive axle. The second PTO clutch remains engaged such that some power from the first motor also drives the PTO shaft and the loader bucket coupled thereto.

From t2 to t3, traction demand increases, as indicated in plot 1812, as the loader climbs the slope. The second motor torque output remains at peak torque output, shown in plot 1806. Current to the first motor ramps torque output, shown in plot 1802, to fulfil the increasing traction demand. Approaching t3, traction demand declines as the loader reaches the top of the slope. Vehicle speed reduces as the operator slows to stop. In response, the first motor and second motor torque output reduce, as indicated in plot 1802 and plot 1806, respectively.

At t3, the vehicle is stopped and the operator indicates a desire to brake the vehicle. The first motor speed and the second motor speed are low and less than the first shift threshold and second shift threshold, respectively. Consequently, from t3 to t4, the dual motor drive clutch is opened thereby disengaging the first motor and the second motor from the drive axle.

At t4, the vehicle is braked. From t4 to t5, the operator drives the loader bucket while the vehicle is braked. Accumulated debris in the loader bucket increases load. The first motor increases torque output to operate the loader bucket at increased load. The second motor torque output and speed are maintained are low.

At t5, the vehicle speed demand is indicated signaling to the controller to engage one of the first wet clutch and the brake clutch to enable driving. Lower than threshold traction demand, shown in plot 1812, indicates to the controller to shift to single motor drive. Consequently, from t5 to t6, the single motor drive clutch is engaged to drive the drive axle with the second motor. At t6, the single motor drive clutch is engaged, as indicated in plot 1814.

From t6 to t7, the second motor ramps to fulfil the traction demand and increasing vehicle speed demand, shown in plot 1812 and plot 1810, respectively. At t7, the timing diagram ends.

The example shown in the timing diagram 1800 illustrates a series of actions that may be performed while operating the dual motor transmission in the traction power shifting mode to transition between single motor drive and dual motor drive in the first gear. A similar series of actions may be performed while operating the dual motor transmission in another mode, such as, for example, the speed power shifting mode to transition between single motor drive and dual motor drive in the second gear. For example, in response to greater than threshold vehicle speed demand, the series of actions may include maintaining engagement of the single motor drive clutch (e.g., the second wet clutch 124) while actuating the dual motor drive clutch actuator (e.g., the third wet clutch actuator 126a) to engage the dual motor drive clutch (e.g., the third wet clutch 126). In one example, the threshold vehicle speed demand may be the same or similar the examples given with reference to FIG. 13 (e.g., 10 km/hr). In response to an indication to downsize power, such as based on operator input or a sensor indicating a greater than threshold condition, the series of actions may include actuating the dual motor drive clutch actuator (e.g., the third wet clutch actuator 126a) to disengage the dual motor drive clutch (e.g., the third wet clutch 126) while maintaining engagement of the single motor drive clutch (e.g., the second wet clutch 124).

FIG. 19 is a plot 1900 illustrating a relationship between torque, power, and speed for an electric motor in a transmission, such as the dual motor transmission 100. Plot line 1908 plots torque in Newton meters (Nm) as speed in revolutions-per-minute (RPM) increases for an exemplary main drive motor. Plot line 1910 plots power in Watts (W) as speed in revolutions-per-minute (RPM) increases for the exemplary main drive motor. Three phases are indicated on the plot 1900. A first phase from 0 to ~1000 RPM (e.g., before line 1902), a second phase from ~1000 to ~3400 RPM (e.g., between the line 1902 and the line 1904), and a third phase beyond ~3400 RPM (e.g., after line 1904).

During the first phase, as torque is held constant and speed increases, power increases. During the second phase, as power is held constant and speed increase, torque reduces. During the third phase, where speed approaches its peak, as the as torque goes to 0 Newton meters (Nm), power goes towards 0 watts (W). For some transmission configurations, traction power may be limited during the first phase, e.g., the constant torque phase. By operating the dual motor transmission in the dual motor drive high traction mode (e.g., the third operation 500 in FIG. 5), the constant torque phase can extend to higher vehicle speeds and overlap with the constant power phase, as shown by dotted line 1906. For some heavy-duty vehicles, such as, for example, dozers and front loaders, high traction demand is predominant. The PTO motor (e.g., first motor 102) can provide additional power via the dual motor mode at the same gear ratio. For the disclosed assembly, when the transmission is controlled in dual motor high traction mode, available power in the area of maximum power is increased, and the more tractive effort is available as vehicle speed increases, e.g., the distance between line 1902 and 1906. As such, an operator may increase vehicle speed while maintaining tractive effort. When the transmission is controlled in two motor high-speed mode, available power in the area of maximum power is increased, and more power is available as vehicle speed increases.

Plot 2000 shown in FIG. 20 illustrates operating modes of the disclosed dual motor transmission and an exemplary range for an electric motor. The plot includes tractive effort on the y-axis and vehicle speed on the x-axis. As described with reference to plot 1900 in FIG. 19, generally, as vehicle speed increases, tractive effort reduces. Plot line 2002 indicates an operating range of an electric motor. Tractive effort is greatest at lower speeds in the area of peak torque, shown by arrow 2012, and roughly correlating with the first phase described with reference to FIG. 19. Vehicle speed is greatest at lower torques in the area of peak speed, shown by arrow 2016, and roughly correlating with the third phase described with reference to FIG. 19. Between the area of peak torque and the area of peak speed is the area of peak power, shown by arrow 2014, and roughly correlating with the second phase described with reference to FIG. 19.

Plot line 2004 indicates the operating range of the disclosed transmission in first gear single motor drive. The tractive effort is increased in the area of peak torque. Plot line 2006 indicates the operating range of the disclosed transmission in second gear single motor drive. The vehicle speed is increased in the area of peak vehicle speed. Plot line 2008 indicates the operating range of the disclosed transmission in first gear dual motor drive. The tractive effort is further increased over the tractive effort of first gear single motor drive. Plot line 2010 indicates the operating range of the disclosed transmission in second gear dual motor drive. The vehicle speed is further increased over the vehicle speed of second gear single motor drive.

In this way, the systems and methods described herein increase a range of tractive effort and speed for heavy duty vehicles. The transmission layout increases the upper threshold of tractive effort and the upper threshold of vehicle speed by coupling a second motor to the drive axle as demanded. The transmission layout includes two one-way clutches that may be operated to power a PTO device when the vehicle is driving forward, reverse, or at standstill. The transmission may be adjusted between a first gear and a second gear, driven by a single motor or two motors, and PTO device operation, by adjusting a plurality of clutches for a high degree of flexibility and simple control. Moreover, the disclosed systems and methods provide an adaptable solution for heavy duty trucks wherein a transmission may be built from the disclosed platform to include fewer clutches and be tuned for the specific vehicle application. The technical effect of the disclosed transmission is increased operating range for heavy duty trucks.

FIGS. 1, 3-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for an assembly comprising: a first motor positioned on a first shaft, a second motor positioned on a second shaft, a first wet clutch selectively coupled to the first shaft, a second wet clutch selectively coupled to a drive axle, a third wet clutch selectively coupled to the first shaft, a brake clutch fixed to a housing of the assembly, a planetary gearset comprising a sun gear positioned on the second shaft, a planet carrier selectively coupled to the third wet clutch, and a ring gear selectively coupled to the first wet clutch or to the brake clutch, and a first one-way clutch and a second one-way clutch opposing the first one-way clutch, the first one-way clutch and the second one-way clutch selectively coupled to the first shaft, where the first one-way clutch is directly connected to a first gear train to drive a PTO shaft and the second one-way clutch is directly connected to a second gear train to drive the PTO shaft. In a first example of the system, the system further comprises: a controller having instructions that when executed cause the controller to select an operating mode from a plurality of operating modes and based on the operating mode selected, adjust one or more of the first wet clutch, the second wet clutch, the third wet clutch, and the brake clutch to output power from one or both of the first motor and the second motor to the drive axle. In a second example of the system, optionally including the first example, the plurality of operating modes comprise a single motor drive mode in a first gear, the single motor drive mode in a second gear that is higher than the first gear, a dual motor drive mode in the first gear, the dual motor drive mode in the second gear, and tow mode, wherein single motor drive comprises powering rotation of the drive axle with the second motor, dual motor drive comprises powering rotation of the drive axle with the first motor and the second motor, and tow mode comprises powering rotation of the drive axle with the first motor. In a third example of the system, optionally including one or both of the first and second examples, the system further comprises: a controller having instructions that when executed cause the controller to shift between shifting modes, the shifting modes comprising a normal shifting mode in single motor drive between a first gear and second gear, a traction power shifting mode between single motor drive and dual motor drive in the first gear, a speed power shifting mode between single motor drive and dual motor drive in the second gear, and a high power shifting mode in dual motor drive mode between the first gear and the second gear. In a fourth example of the system, optionally including one or more or each of the first through third examples, the system further comprises: a controller having instructions that when executed cause the controller to adjust one of the first one-way clutch and the second one-way clutch based on an indication to output power to an auxiliary component, the indication comprising a direction of rotation of the first motor. In a fifth example of the system, optionally including one or more or each of the first through fourth examples, the system further comprises: a controller having instructions that when executed cause the controller to adjust the third wet clutch based on an indication of degradation of the second motor.

The disclosure also provides support for a method for a transmission comprising a first motor selectively coupled to a power take-off unit and a drive axle, and a second motor selectively coupled to the drive axle, the method comprising: operating one of a first wet clutch or both of a second wet clutch and a third wet clutch to shift between a first operating mode and a second operating mode in the transmission, and operating one of a first one-way clutch and a second one-way clutch opposing the first one-way clutch to drive the power take-off unit, wherein the first operating mode comprises powering, with the first motor and the second motor, rotation of the drive axle at a first gear ratio, and wherein the second operating mode comprises powering, with the first motor and the second motor, rotation of the drive axle at a second gear ratio that is higher than the first gear ratio. In a first example of the method, the first wet clutch is coaxial with a first motor output shaft and coupled to a ring gear, the second wet clutch is coaxial with the drive axle, and the third wet clutch is coaxial with the first motor output shaft and coupled to a planet carrier. In a second example of the method, optionally including the first example, the method further comprises: adjusting one of the first one-way clutch and the second one-way clutch based on an indication to output power to an auxiliary component, the indication comprising a direction of rotation of the first motor. In a third example of the method, optionally including one or both of the first and second examples, the method further comprises: engaging the first wet clutch and disengaging the second wet clutch to shift the transmission to the first operating mode in response to a traction demand greater than a threshold traction demand, and engaging the second wet clutch and the third wet clutch to shift the transmission to the second operating mode in response to a speed demand greater than a threshold speed demand. In a fourth example of the method, optionally including one or more or each of the first through third examples, the method further comprises: operating the second wet clutch to shift to a third operating mode comprising using only the second motor to power rotation of the drive axle at the second gear ratio. In a fifth example of the method, optionally including one or more or each of the first through fourth examples, the method further comprises: engaging the first wet clutch and disengaging the second wet clutch and the third wet clutch to shift the transmission to the first operating mode in response to an indication of greater than a threshold traction demand, and engaging second wet clutch and disengaging the first wet clutch and the third wet clutch to shift the transmission to the third operating mode in response to an indication of greater than a first threshold speed demand, and engaging the second wet clutch and the third wet clutch to shift the transmission to the second operating mode in response to greater than a second threshold speed demand, the second threshold speed demand greater than the first threshold speed demand. In a sixth example of the method, optionally including one or more or each of the first through fifth examples, the method further comprises: operating the third wet clutch to shift to a tow mode comprising powering rotation of the drive axle with only the first motor. In a seventh example of the method, optionally including one or more or each of the first through sixth examples, the method further comprises: engaging the third wet clutch and disengaging the first wet clutch and the second wet clutch to shift to the tow mode in response to an indication of degradation of the second motor.

The disclosure also provides support for a method for a transmission comprising a first motor selectively coupled to a power take-off unit and a drive axle, and a second motor selectively coupled to the drive axle, the method comprising: operating one or more of a first wet clutch and a second wet clutch to shift between a first operating mode and a second operating mode in the transmission, and operating one or more of a first one-way clutch and a second one-way clutch opposing the first one-way clutch to drive the power take-off unit, wherein the first operating mode comprises powering, with the second motor, rotation of the drive axle at a first gear ratio, and wherein the second operating mode comprises powering, with the first motor and the second motor, rotation of the drive axle at the first gear ratio. In a first example of the method, the first wet clutch is fixed to a housing of the transmission and the second wet clutch is coaxial with a first motor output shaft. In a second example of the method, optionally including the first example, the method further comprises: engaging the first wet clutch and disengaging the second wet clutch to shift the transmission to the first operating mode in response to a traction demand greater than a threshold traction demand, and engaging the second wet clutch and disengaging the first wet clutch to shift the transmission to the second operating mode in response to an indication of power downsizing. In a third example of the method, optionally including one or both of the first and second examples, the method further comprises: adjusting one of the first one-way clutch and the second one-way clutch based on an indication to output power to an auxiliary component, the indication comprising a direction of rotation of the first motor. In a fourth example of the method, optionally including one or more or each of the first through third examples, the method further comprises: operating a third wet clutch to shift to a tow mode comprising powering rotation of the drive axle with only the first motor. In a fifth example of the method, optionally including one or more or each of the first through fourth examples, the method further comprises: engaging the third wet clutch and disengaging the first wet clutch and the second wet clutch to shift to the tow mode in response to an indication of degradation of the second motor.

In another representation, a method for an assembly comprising a first motor positioned on a first shaft, a second motor positioned on a second shaft, a transmission gear train selectively coupling at least one of the first motor and the second motor to a drive axle, and a PTO shaft selectively coupled to the first motor by operating one of a first one-way clutch and a second one-way clutch opposing the first one-way clutch, the method comprising: selecting a mode of operation; and adjusting one or more of a plurality of clutches of the transmission gear train based on the mode of operation. The method of claim 1, wherein selecting the mode of operation includes selecting one or more of a single motor drive or a dual motor drive, an operating gear, and driving the PTO shaft. The method of claim 1, further comprising adjusting one or more of the first one-way clutch and the second one-way clutch based on an indication to output power to the PTO shaft, the indication comprising a direction of rotation of the first motor. The method of claim 1, further comprising selecting one of a plurality of shifting modes, the shifting modes comprising a first shifting mode in single motor drive between a first gear and second gear, a second shifting mode between single motor drive and dual motor drive in the first gear, a third shifting mode between single motor drive and dual motor drive in the second gear, and a fourth shifting mode in dual motor drive between the first gear and the second gear.

In another representation, a method for a transmission comprising a first motor selectively coupled to a power take-off unit and a drive axle, and a second motor selectively coupled to the drive axle, the method comprising: operating one or more of a first wet clutch and a second wet clutch to shift between a first operating mode and a second operating mode in the transmission; and, operating one or more of a first one-way clutch and a second one-way clutch opposing the first one-way clutch to drive the power take-off unit; wherein the first operating mode comprises powering, with the second motor, rotation of the drive axle at a first gear ratio, and wherein the second operating mode comprises powering, with the second motor, rotation of the drive axle at a second gear ratio that is higher than the first gear ratio; and wherein the first wet clutch is fixed to a housing of the transmission and the second wet clutch that is coaxial with the drive axle.

In another representation, a method for a transmission comprising a first motor selectively coupled to a power take-off unit and a drive axle, and a second motor selectively coupled to the drive axle, the method comprising: operating one or more of a first wet clutch and a second wet clutch to shift between a first operating mode and a second operating mode in the transmission; and, operating one or more of a first one-way clutch and a second one-way clutch opposing the first one-way clutch to drive the power take-off unit; wherein the first operating mode comprises powering, with the second motor, rotation of the drive axle at a second gear ratio, and wherein the second operating mode comprises powering, with the first motor and the second motor, rotation of the drive axle at the second gear ratio; and wherein the first wet clutch is coaxial with the drive axle and the second wet clutch is coaxial with a first motor output shaft.

In another representation, a method for a transmission comprising a first motor selectively coupled to a power take-off unit and a drive axle, and a second motor selectively coupled to the drive axle, the method comprising: operating one or more of a first wet clutch and a second wet clutch to shift between a first operating mode and a second operating mode in the transmission; and, operating one or more of a first one-way clutch and a second one-way clutch opposing the first one-way clutch to drive the power take-off unit; wherein the first operating mode comprises powering, with the second motor, rotation of the drive axle at a first gear ratio, and wherein the second operating mode comprises powering, with the first motor and the second motor, rotation of the drive axle at a second gear ratio that is lower than the first gear ratio; and wherein the first wet clutch is coaxial with the drive axle and the second wet clutch is coaxial with a first motor output shaft.

In another representation, a method for a transmission comprising a first motor selectively coupled to a power take-off unit and a drive axle, and a second motor selectively coupled to the drive axle, the method comprising: operating one or more of a first wet clutch or both of a second wet clutch and a third wet clutch to shift between a first operating mode and a second operating mode in the transmission; and operating one or more of a first one-way clutch and a second one-way clutch opposing the first one-way clutch to drive the power take-off unit; wherein the first operating mode comprises powering, with the second motor, rotation of the drive axle at a first gear ratio, and wherein the second operating mode comprises powering, with the first motor and the second motor, rotation of the drive axle at a second gear ratio that is higher than the first gear ratio; and wherein the first wet clutch is coupled to a housing of the transmission, the second wet clutch is coaxial with a first motor output shaft, and the third wet clutch is coaxial with the first motor output shaft and coupled to a planet carrier.

In another representation, a method for a transmission comprising a first motor selectively coupled to a power take-off unit and a drive axle, and a second motor selectively coupled to the drive axle, the method comprising: operating one or more of a first wet clutch, a second wet clutch, and a third wet clutch to shift between a first operating mode, a second operating mode, and a third operating mode in the transmission; operating one or more of a first one-way clutch and a second one-way clutch opposing the first one-way clutch to drive the power take-off unit; wherein the first operating mode comprises powering, with the second motor, rotation of the drive axle at a first gear ratio, and wherein the second operating mode comprises powering, with the second motor, rotation of the drive axle at a second gear ratio that is higher than the first gear ratio, and wherein the third operating mode comprises powering, with the first motor, rotation of the drive axle; and wherein the first wet clutch is coupled to a housing of the transmission, the second wet clutch is coaxial with the drive axle, and the third wet clutch is coaxial with a first motor output shaft and coupled to a planet carrier.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An assembly comprising:
a first motor positioned on a first shaft;
a second motor positioned on a second shaft;
a first wet clutch selectively coupled to the first shaft;
a second wet clutch selectively coupled to a drive axle;
a third wet clutch selectively coupled to the first shaft;
a brake clutch fixed to a housing of the assembly;
a planetary gearset comprising a sun gear positioned on the second shaft, a planet carrier selectively coupled to the third wet clutch, and a ring gear selectively coupled to the first wet clutch or to the brake clutch; and
a first one-way clutch and a second one-way clutch opposing the first one-way clutch, the first one-way clutch and the second one-way clutch selectively coupled to the first shaft, where the first one-way clutch is directly connected to a first gear train to drive a PTO shaft and the second one-way clutch is directly connected to a second gear train to drive the PTO shaft.

2. The assembly of claim 1, further comprising a controller having instructions that when executed cause the controller to select an operating mode from a plurality of operating modes and based on the operating mode selected, adjust one or more of the first wet clutch, the second wet clutch, the third wet clutch, and the brake clutch to output power from one or both of the first motor and the second motor to the drive axle.

3. The assembly of claim 2, wherein the plurality of operating modes comprise a single motor drive mode in a first gear, the single motor drive mode in a second gear that is higher than the first gear, a dual motor drive mode in the first gear, the dual motor drive mode in the second gear, and tow mode, wherein single motor drive comprises powering rotation of the drive axle with the second motor, dual motor drive comprises powering rotation of the drive axle with the first motor and the second motor, and tow mode comprises powering rotation of the drive axle with the first motor.

4. The assembly of claim 1, further comprising a controller having instructions that when executed cause the controller to shift between shifting modes, the shifting modes comprising a normal shifting mode in single motor drive between a first gear and second gear, a traction power shifting mode between single motor drive and dual motor drive in the first gear, a speed power shifting mode between single motor drive and dual motor drive in the second gear, and a high power shifting mode in dual motor drive mode between the first gear and the second gear.

5. The assembly of claim 1, further comprising a controller having instructions that when executed cause the controller to adjust one of the first one-way clutch and the second one-way clutch based on an indication to output power to an auxiliary component, the indication comprising a direction of rotation of the first motor.

6. The assembly of claim 1, further comprising a controller having instructions that when executed cause the controller to adjust the third wet clutch based on an indication of degradation of the second motor.

7. A method for a transmission comprising a first motor selectively coupled to a power take-off unit and a drive axle, and a second motor selectively coupled to the drive axle, the method comprising:
operating one of a first wet clutch or both of a second wet clutch and a third wet clutch to shift between a first operating mode and a second operating mode in the transmission; and
operating one of a first one-way clutch and a second one-way clutch opposing the first one-way clutch to drive the power take-off unit;
wherein the first operating mode comprises powering, with the first motor and the second motor, rotation of the drive axle at a first gear ratio, and wherein the second operating mode comprises powering, with the first motor and the second motor, rotation of the drive axle at a second gear ratio that is higher than the first gear ratio.

8. The method of claim 7, wherein the first wet clutch is coaxial with a first motor output shaft and coupled to a ring gear, the second wet clutch is coaxial with the drive axle, and the third wet clutch is coaxial with the first motor output shaft and coupled to a planet carrier.

9. The method of claim 7, further comprising, adjusting one of the first one-way clutch and the second one-way clutch based on an indication to output power to an auxiliary component, the indication comprising a direction of rotation of the first motor.

10. The method of claim 7, further comprising engaging the first wet clutch and disengaging the second wet clutch to shift the transmission to the first operating mode in response to a traction demand greater than a threshold traction demand, and engaging the second wet clutch and the third wet clutch to shift the transmission to the second operating mode in response to a speed demand greater than a threshold speed demand.

11. The method of claim 7, further comprising operating the second wet clutch to shift to a third operating mode comprising using only the second motor to power rotation of the drive axle at the second gear ratio.

12. The method of claim 11, further comprising engaging the first wet clutch and disengaging the second wet clutch and the third wet clutch to shift the transmission to the first operating mode in response to an indication of greater than a threshold traction demand, and engaging second wet clutch and disengaging the first wet clutch and the third wet clutch to shift the transmission to the third operating mode in response to an indication of greater than a first threshold speed demand, and engaging the second wet clutch and the third wet clutch to shift the transmission to the second operating mode in response to greater than a second threshold speed demand, the second threshold speed demand greater than the first threshold speed demand.

13. The method of claim 7, further comprising operating the third wet clutch to shift to a tow mode comprising powering rotation of the drive axle with only the first motor.

14. The method of claim 13, further comprising engaging the third wet clutch and disengaging the first wet clutch and the second wet clutch to shift to the tow mode in response to an indication of degradation of the second motor.

15. A method for a transmission comprising a first motor selectively coupled to a power take-off unit and a drive axle, and a second motor selectively coupled to the drive axle, the method comprising:
operating one or more of a first wet clutch and a second wet clutch to shift between a first operating mode and a second operating mode in the transmission; and
operating one or more of a first one-way clutch and a second one-way clutch opposing the first one-way clutch to drive the power take-off unit;
wherein the first operating mode comprises powering, with the second motor, rotation of the drive axle at a first gear ratio, and wherein the second operating mode comprises powering, with the first motor and the second motor, rotation of the drive axle at the first gear ratio.

16. The method of claim 15, wherein the first wet clutch is fixed to a housing of the transmission and the second wet clutch is coaxial with a first motor output shaft.

17. The method of claim 15, further comprising, engaging the first wet clutch and disengaging the second wet clutch to shift the transmission to the first operating mode in response to a traction demand greater than a threshold traction demand, and engaging the second wet clutch and disengaging the first wet clutch to shift the transmission to the second operating mode in response to an indication of power downsizing.

18. The method of claim 15, further comprising, adjusting one of the first one-way clutch and the second one-way clutch based on an indication to output power to an auxiliary component, the indication comprising a direction of rotation of the first motor.

19. The method of claim 15, further comprising operating a third wet clutch to shift to a tow mode comprising powering rotation of the drive axle with only the first motor.

20. The method of claim 19, further comprising engaging the third wet clutch and disengaging the first wet clutch and the second wet clutch to shift to the tow mode in response to an indication of degradation of the second motor.

* * * * *